: US 10,382,891 B2
(45) Date of Patent: Aug. 13, 2019

(54) SERVER CAPABLE OF PERFORMING AUTHENTICATION WITH SIMPLIFIED AND SECURE SCHEME THAT USERS WHO OPERATE TERMINALS COMMUNICATING DATA WITH EACH OTHER SATISFY PRESCRIBED RELATION, METHOD OF CONTROLLING SERVER, NON-TRANSITORY STORAGE MEDIUM ENCODED WITH COMPUTER READABLE CONTROL PROGRAM, AND INFORMATION PROCESSING SYSTEM

(71) Applicant: NINTENDO CO., LTD., Kyoto-shi, Kyoto (JP)

(72) Inventors: Munetaka Tsuda, Kyoto (JP); Yui Iida, Kyoto (JP); Ryoma Aoki, Kyoto (JP); Ginga Kamei, Kyoto (JP); Masayuki Okada, Kyoto (JP); Hayuru Soma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 511 days.

(21) Appl. No.: 15/054,331

(22) Filed: Feb. 26, 2016

(65) Prior Publication Data

US 2016/0380991 A1 Dec. 29, 2016

(30) Foreign Application Priority Data

Jun. 29, 2015 (JP) .................. 2015-129910

(51) Int. Cl.
*H04W 12/06* (2009.01)
*H04W 4/02* (2018.01)
*H04W 4/21* (2018.01)

(52) U.S. Cl.
CPC ............. *H04W 4/023* (2013.01); *H04W 4/21* (2018.02); *H04W 12/06* (2013.01)

(58) Field of Classification Search
CPC ......... H04W 4/02; H04W 4/21; H04W 4/023; H04W 12/06
See application file for complete search history.

(56) References Cited

U.S. PATENT DOCUMENTS 3,008,367 A 11/1961 Parsons et al.
4,149,444 A 4/1979 Parsons
(Continued)

FOREIGN PATENT DOCUMENTS

EP 1475939 11/2004
JP 11-057215 3/1999
(Continued)

OTHER PUBLICATIONS

Engage (now-defunct online multiplayer gaming service (was defunct at least by 2006)—see pp. 6-7 of IDS filed in U.S. Appl. No. 11/207,194 on Mar. 2, 2006 for more details).
(Continued)

*Primary Examiner* — Khoi V Le
(74) *Attorney, Agent, or Firm* — Nixon & Vanderhye PC

(57) ABSTRACT

A server which can communicate with a plurality of terminals includes an information obtaining unit obtaining position information of each terminal and operation information on an operation onto an operation unit provided on a surface of each terminal, a position determination unit determining whether obtained position information of one terminal and position information of at least one other terminal satisfy a first prescribed condition, an operation determination unit determining whether obtained operation information of one terminal and operation information of at least one other terminal satisfy a second prescribed condition, and a registration manager having information on a user of one terminal and information on a user of at least one other terminal registered in correspondence with each other when both of
(Continued)

the first prescribed condition and the second prescribed condition are satisfied.

20 Claims, 21 Drawing Sheets

(56) References Cited

U.S. PATENT DOCUMENTS

| | | | |
|---|---|---|---|
| 4,679,479 | A | 7/1987 | Koyamato |
| 4,821,121 | A | 4/1989 | Beaulier |
| 4,913,023 | A | 4/1990 | Mizuguchi et al. |
| 5,558,339 | A | 9/1996 | Perlman |
| 5,618,179 | A | 4/1997 | Copperman et al. |
| 6,115,036 | A | 9/2000 | Yamato et al. |
| 6,203,433 | B1 | 3/2001 | Kume |
| 6,366,283 | B1 | 4/2002 | Tampieri |
| 6,488,505 | B1 | 12/2002 | Hightower |
| 6,645,067 | B1 | 11/2003 | Okita et al. |
| 6,658,464 | B2 | 12/2003 | Reisman |
| 6,681,108 | B1 | 1/2004 | Terry |
| 6,692,359 | B1 | 2/2004 | Williams et al. |
| 6,699,125 | B2 | 3/2004 | Kirmse et al. |
| 6,755,654 | B2 | 6/2004 | Hightower |
| 6,755,743 | B1 | 6/2004 | Yamashita et al. |
| 6,821,205 | B2 | 11/2004 | Takahashi et al. |
| 6,845,389 | B1 | 1/2005 | Sen et al. |
| 6,848,997 | B1 | 2/2005 | Hashimoto et al. |
| 6,884,171 | B2 | 4/2005 | Eck et al. |
| 7,032,007 | B2 | 4/2006 | Fellenstein et al. |
| 7,066,818 | B2 | 6/2006 | Ikeda |
| 7,099,304 | B2 | 8/2006 | Liu et al. |
| 7,311,608 | B1 | 12/2007 | Danieli et al. |
| 7,645,195 | B2 | 1/2010 | Hirota |
| 7,828,661 | B1 | 11/2010 | Fish et al. |
| 7,991,895 | B2 | 8/2011 | Leppisaari et al. |
| 8,353,773 | B2 | 1/2013 | Sasaki et al. |
| 8,795,083 | B2 | 8/2014 | Sasaki et al. |
| 9,050,533 | B2 | 6/2015 | Sasaki et al. |
| 9,050,536 | B2 | 6/2015 | Sasaki et al. |
| 9,731,205 | B2 | 8/2017 | Sasaki et al. |
| 9,839,850 | B2 | 12/2017 | Sasaki et al. |
| 9,884,256 | B2 | 2/2018 | Sasaki et al. |
| 9,895,614 | B2 | 2/2018 | Sasaki et al. |
| 2002/0086730 | A1 | 7/2002 | Nakai |
| 2002/0142842 | A1 | 10/2002 | Easley et al. |
| 2002/0142846 | A1 | 10/2002 | Paulsen |
| 2002/0183117 | A1 | 12/2002 | Takahashi et al. |
| 2003/0051003 | A1 | 3/2003 | Clark et al. |
| 2003/0125112 | A1 | 7/2003 | Silvester |
| 2003/0233537 | A1 | 12/2003 | Wohlgemuth et al. |
| 2004/0002382 | A1 | 1/2004 | Ho et al. |
| 2004/0002384 | A1 | 1/2004 | Multerer et al. |
| 2004/0111479 | A1 | 6/2004 | Borden et al. |
| 2004/0152517 | A1 | 8/2004 | Hardisty et al. |
| 2004/0153557 | A1 | 8/2004 | Shochet et al. |
| 2004/0162144 | A1 | 8/2004 | Loose et al. |
| 2004/0164897 | A1 | 8/2004 | Treadwell et al. |
| 2004/0192440 | A1 | 9/2004 | Evans et al. |
| 2004/0224741 | A1 | 11/2004 | Jen et al. |
| 2004/0224769 | A1 | 11/2004 | Hansen et al. |
| 2004/0224772 | A1 | 11/2004 | Canessa et al. |
| 2004/0225386 | A1 | 11/2004 | Thompson et al. |
| 2004/0242201 | A1* | 12/2004 | Sasakura ............... A47G 29/141 455/411 |
| 2005/0160144 | A1 | 7/2005 | Bhatia |
| 2005/0239550 | A1 | 10/2005 | Hardisty et al. |
| 2006/0252548 | A1* | 11/2006 | Sasaki ................... H04W 4/21 463/42 |
| 2012/0220230 | A1 | 8/2012 | Kurata et al. |
| 2012/0329554 | A1 | 12/2012 | Mgrdechian et al. |
| 2013/0232197 | A1 | 9/2013 | Shin et al. |
| 2014/0201284 | A1 | 7/2014 | Horie |
| 2014/0274123 | A1* | 9/2014 | Nixon .................... G05B 11/01 455/456.1 |
| 2014/0310739 | A1* | 10/2014 | Ricci ...................... H04W 4/21 725/28 |
| 2015/0074615 | A1* | 3/2015 | Han ................... G06K 9/00033 715/863 |

FOREIGN PATENT DOCUMENTS

| | | |
|---|---|---|
| JP | 11-207031 | 8/1999 |
| JP | 2001-224865 | 8/2001 |
| JP | 2002-045573 | 2/2002 |
| JP | 2002-157204 | 5/2002 |
| JP | 2003-047778 | 2/2003 |
| JP | 2003-093745 | 4/2003 |
| JP | 2003-340161 | 12/2003 |
| JP | 2004-054340 | 2/2004 |
| JP | 2004-302763 | 10/2004 |
| JP | 2005-006766 | 1/2005 |
| JP | 2005-046304 | 2/2005 |
| JP | 2005-103265 | 4/2005 |
| JP | 2005-137812 | 6/2005 |
| JP | 2006-279814 | 10/2006 |
| JP | 2006-334386 | 12/2006 |
| JP | 2012-178747 | 9/2012 |
| JP | 2014-041658 | 3/2014 |
| JP | 2014-135000 | 7/2014 |
| JP | 5659284 B2 | 1/2015 |
| JP | 2016-143361 | 8/2016 |
| JP | 5979401 B | 8/2016 |
| WO | 00/44458 | 8/2000 |
| WO | 02/061707 | 8/2002 |
| WO | 2007/022487 | 2/2007 |
| WO | 2013/161720 | 10/2013 |

OTHER PUBLICATIONS

Dwango, www.dwango.com (now-defunct online multiplayer gaming service (was defunct at least by 2006)—see pp. 6-7 of IDS filed in U.S. Appl. No. 11/207,194 on Mar. 2, 2006 for more details).
MPG-Net (now-defunct online multiplayer gaming service (was defunct at least by 2006)—see pp. 6-7 of IDS filed in U.S. Appl. No. 11/207,194 on Mar. 2, 2006 for more details).
Quantum Link (for the Commodore64—system was later rebranded as America Online— see pp. 6-7 of IDS filed in U.S. Appl. No. 11/207,194 on Mar. 2, 2006 for more details).
Pogo.com-games, chat and win prizes! Play your favorite online games here for Free!, undated, 3 pages, http://www.pogo.com/home/home.jsp?ske=pogo&sls=2.
Wave Race—Blue Storm for the Nintendo GameCube platform (Jet Ski racing game released for Nintendo GameCube in 2001—see pp. 1-2 of IDS filed in U.S. Appl. No. 11/207,194 on Mar. 2, 2006 for more details).
Activision's Tony Hawk American Sk8Land for Nintendo DS (physical game—no document—see pp. 1-2 of IDS filed in U.S. Appl. No. 11/207,194 on Mar. 2, 2006 for more details).
Namco's Ridge Racer 6 for Xbox 360 (physical game—no document—see pp. 1-2 of IDS filed in U.S. Appl. No. 11/207,194 on Mar. 2, 2006 for more details).
Sony's Wipeout Pure for PSP (physical game—no document—see pp. 1-2 of IDS filed in U.S. Appl. No. 11/207,194 on Mar. 2, 2006 for more details).
Vivendi's Crash Nitro Kart for NGage (physical game—no document—see pp. 1-2 of IDS filed in U.S. Appl. No. 11/207,194 on Mar. 2, 2006 for more details).
Midway's San Francisco Rush 2049 for the Sega Dreamcast (physical game—no document—see pp. 1-2 of IDS filed in U.S. Appl. No. 11/207,194 on Mar. 2, 2006 for more details).
SegaNet (now-defunct free Sega internet service that was provided for the Dreamcast console (was defunct at least by 2006)—see p. 4 of IDS filed in U.S. Appl. No. 11/207,194 on Mar. 2, 2006 for more details).
Sega HEAT (now-defunct website—see p. 5 of IDS filed in U.S. Appl. No. 11/207,194 on Mar. 2, 2006 for more details).

(56) References Cited

OTHER PUBLICATIONS

Anonymous, SIP/SIMPLE Presence Specification, Open Mobile Alliance, OMA-PAG-SIMPLE-Spec-V1_0_0-20041118-D, Nov. 18, 2004, pp. 1-86.
AOL, www.aol.com, http://games.aol.com/aimgames, 11 pages (2006).
www.zone.com, MSN Games, People and Chat, 3 pages (2006).
http://www.cnn.com/TECH/computing/9802/12/online_gaming_part2/, Feb. 12, 1998, 4 pages.
http://www.findarticles.com/p/articles/mi_m0EIN/is_1996_May_16/ai_18290451, May 16, 1996, 2 pages.
http://games.ign.com/objects/027/027615.html, 3 pages (1996-2000).
http://www.internetnews.com/xSP/article.php/45591, Dec. 18, 1998, 4 pages.
Nokia Press Release, "New N-Gage™ Titles Turn Up the Heat on Mobile Gaming", Dec. 1, 2003, 2 pages, http://press.nokia.com/PR/200312/926705_5.html.
Nokia Press Release, "Nokia shows multiplayer Java games with key community features at E3", May 12, 2004, 2 pages, http://press.nokia.com/PR/200405/945290_5.html.
Information Disclosure Statement filed in U.S. Appl. No. 11/207,194 (Mar. 2, 2006).
www.safelibraries.org, Dangers Children Face in Cyberspace, 5 pages (Mar. 2006).
CheckIM.com, "Proactive protection for the masses, About," 2 pages (2004).
CheckIM.com, "Proactive protection for the masses, Trace Online Predators," 2 pages (2005).
Xbox Live, http://www.xbox.com/en-US/live, 4 pages (downloaded Feb. 28, 2006).
GameSpy, www.gamespy.net, 5 pages (copyright 1995-2005).
Quazal, www.quazal.com, 10 pages (2004).
Warp Pipe, www.warpipe.com, http://cubeonline.warppipe.com/gettingstarted/finding_opponents.html, 5 pages (2003-2006).
NGage Arena, www.n-gage.com, http://www.n-gage.com/en-US/support/NgageArena/featuresglossary.htm, 4 pages (2006).
Battle.net, www.battle.net, 5 pages (2006).
Xfire, www.xfire.com, 14 pages (2006).
Demonware, www.demonware.net, 6 pages (2006).
Mplayer, http://web.archive.org/web/20000510010549/http://mplayer.com/, http://web.archive.org/web/20001109171600/www.mplayer.com/gamers/help/online/, 5 pages (May 9, 2000).
TEN (Total Entertainment Network), Business Wire (1996), 2 pages.
Kali, www.kali.net, 3 pages (1995-2005).
GameSpot, www.gamespot.com, 5 pages (2006).
N-Gage, Oct. 7, 2003, http://en.wikipedia.org/wiki/N-Gage, 11 pages.
U.S. Appl. No. 15/861,838, filed Jan. 4, 2018, Sasaki et al.

* cited by examiner

FIG.5

| USER ID | USER NAME | FRIEND USER |
|---------|-----------|-------------|
| T1 | USER P | Q, R |
| T2 | USER Q | P, R |
| T3 | USER R | P, Q |
| ⋮ | ⋮ | ⋮ |

SERVER CAPABLE OF PERFORMING AUTHENTICATION WITH SIMPLIFIED AND SECURE SCHEME THAT USERS WHO OPERATE TERMINALS COMMUNICATING DATA WITH EACH OTHER SATISFY PRESCRIBED RELATION, METHOD OF CONTROLLING SERVER, NON-TRANSITORY STORAGE MEDIUM ENCODED WITH COMPUTER READABLE CONTROL PROGRAM, AND INFORMATION PROCESSING SYSTEM

This nonprovisional application is based on Japanese Patent Application No. 2015-129910 filed with the Japan Patent Office on Jun. 29, 2015, the entire contents of which are hereby incorporated by reference.

FIELD

The present disclosure relates to a server which can communicate data with an information terminal.

BACKGROUND AND SUMMARY

Portable information terminals such as smartphones have recently widely been used. The portable information terminal is connected to a server through a network. Opportunities for a user to make use of various network services provided by the server with the use of such a portable information terminal have increased.

In addition, what is called social network service (SNS) has also become prevalent. The SNS can be made use of not only through personal computers but also through portable information terminals, and SNS made use of only through portable information terminals is also provided.

Such a service can be enjoyed more comfortably and casually among friends than among unacquainted persons.

In this connection, in order to authenticate friends, for example, in playing a communication game, a scheme in which counterpart identification information for identifying another user who is a friend is mutually input to a portable information terminal for authentication has been proposed.

Mutual input of counterpart identification information for identifying another user, however, is bothersome, and hence a simplified authentication scheme is required. On the other hand, a secure authentication scheme for avoiding erroneous authentication of a third party is also required.

An object of the present disclosure is to provide a server capable of performing authentication with a simplified and secure scheme that users who operate terminals communicating data with each other satisfy prescribed relation, a method of controlling a server, a non-transitory storage medium encoded with a computer readable program for controlling a server, and an information processing system.

A server capable of communicating with a plurality of terminals according to one aspect of the present disclosure includes an information obtaining unit obtaining position information of each terminal and operation information of an operation onto an operation unit provided on a surface of each terminal, a position determination unit determining whether or not the obtained position information of one terminal and the obtained position information of at least one other terminal satisfy a first prescribed condition, an operation determination unit determining whether or not the obtained operation information of one terminal and the obtained operation information of at least one other terminal satisfy a second prescribed condition, and a registration manager having information on a user of one terminal and information on a user of at least one other terminal registered in correspondence with each other when both of the first prescribed condition and the second prescribed condition are satisfied.

In the exemplary embodiment, the information obtaining unit obtains time information together with at least one of position information and operation information of each terminal which are to be obtained. The registration manager may have the information on the user of one terminal and the information on the user of at least one other terminal registered in correspondence with each other, based on a result of determination by the position determination unit and the operation determination unit and on the obtained time information.

In the exemplary embodiment, the position determination unit may determine whether or not a distance from a position indicated by the position information of one terminal to a position indicated by the position information of at least one other terminal is within a prescribed distance.

In the exemplary embodiment, the registration manager may transmit information indicating the user of at least one other terminal to one terminal and transmit the information indicating the user of one terminal to at least one other terminal when both of the first prescribed condition and the second prescribed condition are satisfied.

In the exemplary embodiment, the registration manager may have the information on the user of one terminal and the information on the user of at least one other terminal registered in correspondence with each other when the registration manager obtains an instruction for registering the information on the users from one terminal and at least one other terminal after the registration manager transmitted the information indicating the user of at least one other terminal and transmitted the information indicating the user of one terminal.

In the exemplary embodiment, the registration manager may have information on a user of one terminal and information on users of at least two other terminals registered in correspondence with each other when the registration manager obtains an instruction for registering information on a plurality of users of terminals other than the user's own terminal from at least three terminals.

A method of controlling a server capable of communicating with a plurality of terminals according to one aspect of the present disclosure includes the steps of obtaining position information of each terminal and operation information of an operation onto an operation unit provided on a surface of each terminal, determining whether or not the obtained position information of one terminal and the obtained position information of at least one other terminal satisfy a first prescribed condition, determining whether or not the obtained operation information of one terminal and the obtained operation information of at least one other terminal satisfy a second prescribed condition, and registering information on a user of one terminal and information on a user of at least one other terminal in correspondence with each other when both of the first prescribed condition and the second prescribed condition are satisfied.

A non-transitory storage medium encoded with a computer readable control program executed by a computer of a server capable of communicating with a plurality of terminals according to one aspect of the present disclosure, the control program causes the computer to function as an information obtaining unit obtaining position information of each terminal and operation information of an operation onto an operation unit provided on a surface of each terminal, a position determination unit determining whether or not the obtained position information of one terminal and the obtained position information of at least one other terminal satisfy a first prescribed condition, an operation determination unit determining whether or not the obtained operation information of one terminal and the obtained operation information of at least one other terminal satisfy a second prescribed condition, and a registration manager having information on a user of one terminal and information on a user of at least one other terminal registered in correspondence with each other when both of the first prescribed condition and the second prescribed condition are satisfied.

An information processing system according to one aspect of the present disclosure includes a plurality of terminals and a server capable of communicating with the plurality of terminals. The server includes an information obtaining unit obtaining position information of each terminal and operation information of an operation onto an operation unit provided on a surface of each terminal, a position determination unit determining whether or not the obtained position information of one terminal and the obtained position information of at least one other terminal satisfy a first prescribed condition, an operation determination unit determining whether or not the obtained operation information of one terminal and the obtained operation information of at least one other terminal satisfy a second prescribed condition, and a registration manager having information on a user of one terminal and information on a user of at least one other terminal registered in correspondence with each other when both of the first prescribed condition and the second prescribed condition are satisfied.

In the exemplary embodiment, each terminal includes a touch panel capable of accepting an operation input from a user. The information obtaining unit may obtain operation information of an operation onto the touch panel of each terminal.

In the exemplary embodiment, each terminal may have a display unit displaying a plurality of objects, which can selectively accept an input from the user through the touch panel.

In the exemplary embodiment, each terminal may further include a display control unit having the display unit display the plurality of objects such that arrangement of at least one object of the plurality of objects displayed on the display unit is changed.

In the exemplary embodiment, the plurality of objects are different in at least one of a color and a form.

In the exemplary embodiment, the operation determination unit may determine whether or not an input of an identical object among the plurality of objects has been accepted, as the operation information obtained by the information obtaining unit from at least two terminals.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram illustrating user management information managed by a registration manager 55 based on the embodiment.

DETAILED DESCRIPTION OF NON-LIMITING EXAMPLE EMBODIMENTS

Figure 1:
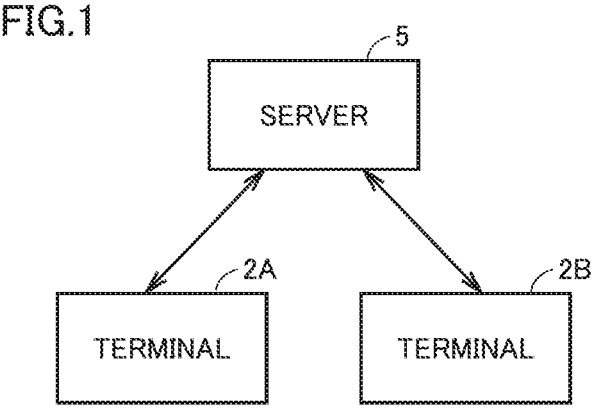
FIG. 1 is a diagram showing a configuration of one example of an information processing system based on an embodiment.

This embodiment will be described in detail with reference to the drawings. The same or corresponding elements in the drawings have the same reference characters allotted and description thereof will not be repeated.

Embodiment

Configuration of Information Processing System

FIG. 1 is a diagram showing a configuration of one example of an information processing system based on an embodiment.

As shown in FIG. 1, an information processing system includes a server 5 and a plurality of terminals 2A and 2B. Terminals 2A and 2B are provided to be able to communicate with server 5 and can communicate data with another terminal through server 5.

Terminals 2A and 2B are any information processing apparatuses which can communicate data. In the present embodiment, terminals 2A and 2B may be, for example, a portable (also referred to as mobile) device such as a portable game device, a portable telephone, or a smartphone, a stationary device such as a personal computer or a home game console, or a large apparatus such as an arcade game machine.

Server 5 is any information processing apparatus capable of communicating data with terminals 2A and 2B. Though terminals 2A and 2B are described in the present example, limitation to that number of terminals is not particularly intended, and more terminals can also be provided so long as the number is two or more.

A configuration of terminals 2A and 2B (hereinafter also collectively referred to as terminal 2) will be described below.

Figure 2:
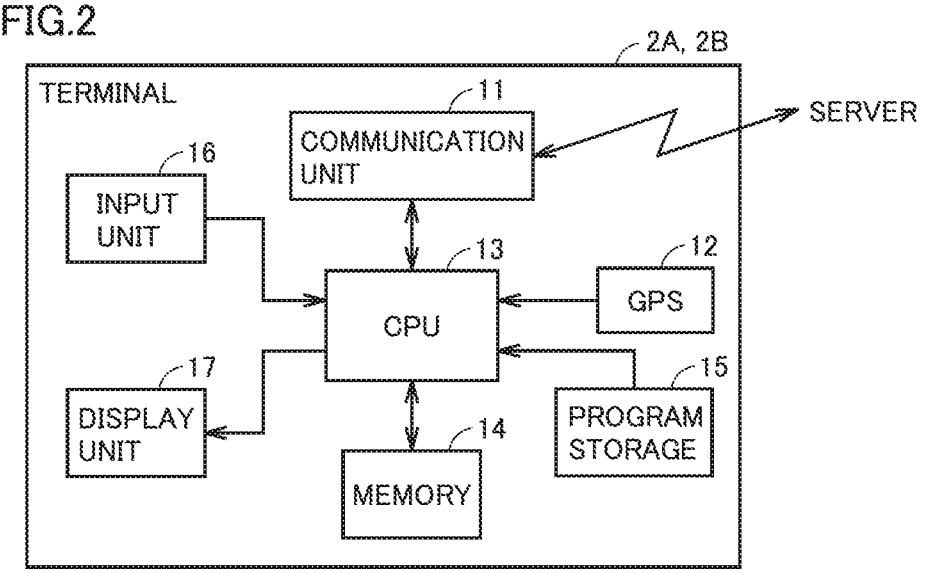
FIG. 2 is a diagram illustrating a configuration of a terminal 2 based on the embodiment.

FIG. 2 is a diagram illustrating a configuration of terminal 2 based on the embodiment.

As shown in FIG. 2, terminal 2 includes a communication unit 11, a GPS 12, a CPU 13, a memory 14, a program storage 15, an input unit 16, and a display unit 17. CPU 13 is an information processing unit for performing various types of information processing performed in terminal 2. CPU 13 performs the various types of information processing with the use of memory 14. Program storage 15 stores various programs (including a communication program and an application program) executed in terminal 2. Program storage 15 is any storage device (storage medium) which can be accessed by CPU 13. Program storage 15 may be implemented, for example, by a storage contained in terminal 2 such as a hard disk or a memory, a storage medium which can be attached to or removed from terminal 2 such as an optical disc or a cartridge, or both of the storage and the storage medium.

In the present embodiment, in terminal 2, at least two types of programs of an application program and a communication program are stored in program storage 15.

A application program is a program for executing any application. The application program may be, for example, a program for performing processing for registering another user using another terminal as a friend.

A communication program is a program for data communication with server 5. For example, a communication program has communication unit 11 perform an operation for communication in response to a command from an application.

Input unit 16 is implemented as a button or a touch panel and accepts an instruction from a user. For example, input unit 16 may be provided on a surface of terminal 2, together with display unit 17.

Display unit 17 displays an image generated through information processing.

Global positioning system (GPS) 12 receives a signal from a GPS satellite and calculates a position of terminal 2.

Terminal 2 may be implemented by a plurality of apparatuses. For example, terminal 2 may be configured in such a manner that an apparatus including communication unit 11 is removably connected to an apparatus including CPU 13 and memory 14. Terminal 2 may be implemented by a main body apparatus having CPU 13 and an apparatus having input unit 16 and/or display unit 17, which are separate from each other. For example, in another embodiment, terminal 2 may be implemented by a main body apparatus and a terminal apparatus having input unit 16 and display unit 17, or by a main body apparatus and an operation apparatus having input unit 16. Terminal 2 may employ a television as a display apparatus, without including display unit 17.

In another embodiment, at least a part of information processing performed in terminal 2 may be performed as distributed among a plurality of apparatuses capable of communicating over a network (a wide area network and/or a local network).

Figure 3:
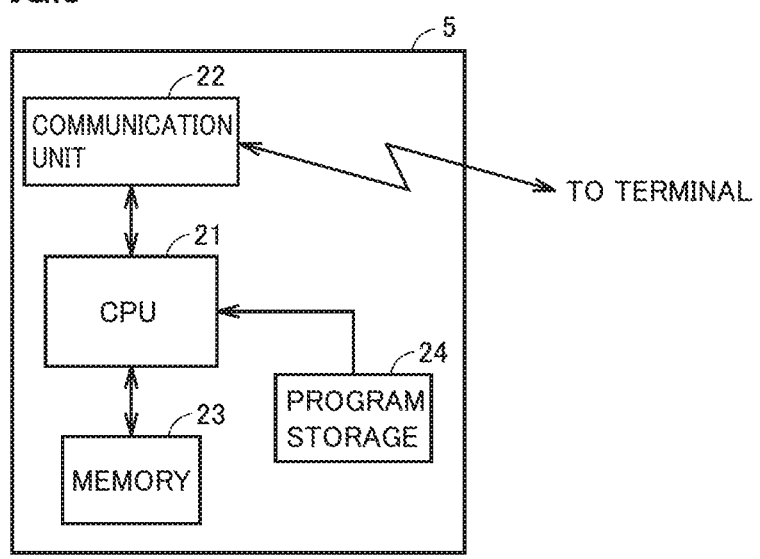
FIG. 3 is a diagram illustrating a configuration of a server 5 based on the embodiment.

FIG. 3 is a diagram illustrating a configuration of server 5 based on the embodiment.

Referring to FIG. 3, server 5 includes a communication unit 22, a CPU 21, a memory 23, and a program storage 24. Since each function is basically the same as described in connection with terminal 2, detailed description thereof will not be repeated. Though an input unit and a display unit are not provided, an input unit and a display unit can also be provided.

In another embodiment, at least a part of information processing performed in server 5 may be performed as distributed among a plurality of apparatuses capable of communicating over a network (a wide area network and/or a local network).

Server 5 and terminal 2 may have a clock function obtaining time information, although not shown.

<Functional Block Configuration>

Figure 4:
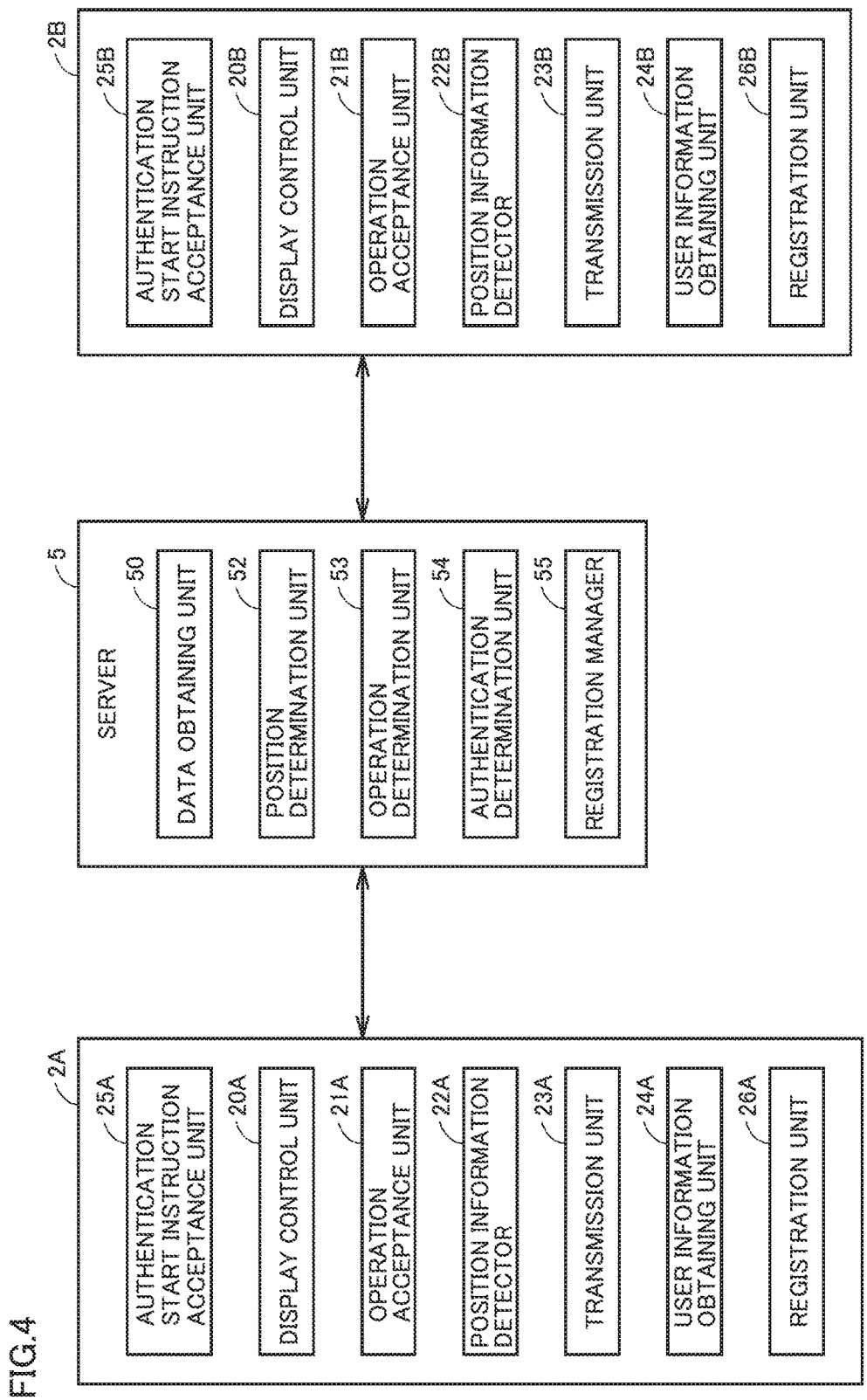
FIG. 4 is a diagram illustrating each functional block configuration of the information processing system based on the embodiment.

FIG. 4 is a diagram illustrating each functional block configuration of the information processing system based on the embodiment.

As shown in FIG. 4, by way of example, a configuration of functional blocks of terminals 2A and 2B and server 5 is shown. In the present example, data communication between server 5 and terminal 2A and terminal 2B will be described.

The functional block of terminals 2A and 2B is implemented as CPU 13 of terminal 2 executes a program stored in program storage 15 in cooperation with each unit.

The functional block of server 5 is implemented as CPU 21 of server 5 executes a program stored in program storage 24 in cooperation with each unit.

Terminal 2A includes a display control unit 20A, an operation acceptance unit 21A, a position information detector 22A, a transmission unit 23A, a user information obtaining unit 24A, an authentication start instruction acceptance unit 25A, and a registration unit 26A.

Display control unit 20A controls contents to be displayed on display unit 17. In the present example, by way of example, an operation panel operated by a user is displayed.

Operation acceptance unit 21A accepts an operation input from a user.

Position information detector 22A detects position information of terminal 2A. Specifically, position information of terminal 2A is detected by using GPS 12.

Transmission unit 23A transmits operation information accepted by operation acceptance unit 21A to server 5. The transmission unit transmits the position information of terminal 2A detected by position information detector 22A to server 5.

User information obtaining unit 24A obtains user information transmitted from server 5.

Authentication start instruction acceptance unit 25A accepts an instruction for start of authentication from a user.

Registration unit 26A registers another user who uses another terminal as a friend in response to an instruction from server 5.

Terminal 2B includes a display control unit 20B, an operation acceptance unit 21B, a position information detector 22B, a transmission unit 23B, a user information obtaining unit 24B, an authentication start instruction acceptance unit 25B, and a registration unit 26B.

Display control unit 20B controls contents to be displayed on display unit 17. In the present example, by way of example, an operation panel operated by a user is displayed.

Operation acceptance unit 21B accepts an operation input from a user.

Position information detector 22B detects position information of terminal 2B. Specifically, position information of terminal 2B is detected by using GPS 12.

Transmission unit 23B transmits operation information accepted by operation acceptance unit 21B to server 5. The transmission unit transmits the position information of terminal 2B detected by position information detector 22B to server 5.

User information obtaining unit 24B obtains user information transmitted from server 5.

Authentication start instruction acceptance unit 25B accepts an instruction for start of authentication from a user.

Registration unit 26B registers another user who uses another terminal as a friend in response to an instruction from server 5.

In the present embodiment, server 5 performs processing for authenticating users who use terminals 2A and 2B as satisfying prescribed relation based on operation information and position information from terminals 2A and 2B.

Server 5 includes a data obtaining unit 50, a position determination unit 52, an operation determination unit 53, an authentication determination unit 54, and a registration manager 55.

Data obtaining unit 50 obtains data transmitted from transmission units 23A and 23B of terminals 2A and 2B. In the present example, data includes position information and operation information of terminals 2A and 2B by way of example.

Position determination unit 52 determines whether or not a prescribed condition (a first condition) is satisfied based on position information obtained in data obtaining unit 50 and transmitted from terminals 2A and 2B. In the present example, position determination unit 52 determines, as a prescribed condition, whether or not terminals 2A and 2B are located within a prescribed distance based on position information of terminal 2A and position information of terminal 2B.

When position determination unit 52 determines that terminals 2A and 2B are located within the prescribed distance based on the position information of terminal 2A and the position information of terminal 2B, it determines that positions of terminals 2A and 2B are the same.

Operation determination unit 53 determines whether or not a prescribed condition (a second prescribed condition) is satisfied based on operation information obtained by data obtaining unit 50 and transmitted from terminals 2A and 2B. In the present example, operation determination unit 53 determines, as a prescribed condition, whether or not the same operations have been performed based on operation information of terminal 2A and operation information of terminal 2B.

When operation determination unit 53 determines that the same operations have been performed based on the operation information of terminal 2A and the operation information of terminal 2B, it determines that the operations have matched with each other.

Authentication determination unit 54 authenticates users who use terminals 2A and 2B as satisfying prescribed relation, based on a result of determination by position determination unit 52 and operation determination unit 53.

In the present example, authentication determination unit 54 authenticates the users who use terminals 2A and 2B as satisfying prescribed relation (by way of example, face-to-face relation) when position determination unit 52 determines that terminals 2A and 2B are at the same position and operation determination unit 53 determines that the operations in terminals 2A and 2B have matched with each other.

Registration manager 55 performs processing for registering users as friends in response to an instruction, based on a result of authentication by authentication determination unit 54. In the present example, when authentication determination unit 54 has authenticated the users as satisfying prescribed relation (face-to-face relation) as a result of authentication, registration manager 55 determines whether or not a registration condition is satisfied. When the condition is satisfied, registration manager 55 performs friend registration processing.

FIG. 5 is a diagram illustrating user management information managed by registration manager 55 based on the embodiment.

As shown in FIG. 5, a user ID for specifying a user is issued as user management information for each user. By way of example, a user ID is issued when a user registers a user name in server 5, for example, through terminal 2, and associated in the user management information. Each terminal stores information on a user (user ID) who operates the terminal.

Then, a user name and a name of a user registered as a friend are associated with each other for each user ID.

In the present example, by way of example, a user P uses terminal 2A and a user Q uses terminal 2B.

A user ID "T1" is issued and allocated in correspondence with user P.

A user ID "T2" is issued and allocated in correspondence with user Q.

In correspondence with the user ID "T1", user P and names of other users (friend users Q and R) of which friend relation with user P has been registered are registered in correspondence. Though a case that names of other users with which friend relation has been registered are registered in correspondence is described in the present example, a user ID corresponding to another user name is also acceptable.

In correspondence with the user ID "T2", user Q and names of other users (friend users P and R) of which friend relation with user Q has been registered are registered in correspondence.

In correspondence with a user ID "T3", user R and names of other users (friend users P and Q) of which friend relation with user R has been registered are registered in correspondence.

Data is registered in association similarly for other user IDs.

Each terminal may also store user information on other users with which friend relation has been registered.

Figure 6:
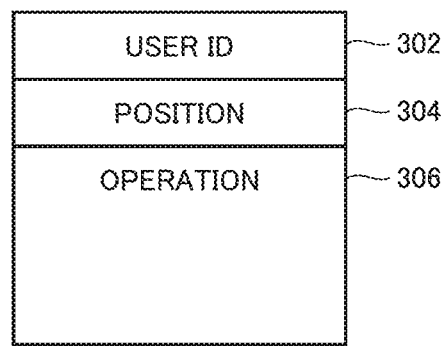
FIG. 6 is a diagram illustrating one example of data on transmission information transmitted to server 5 based on the embodiment.

FIG. 6 is a diagram illustrating one example of data on transmission information transmitted to server 5 based on the embodiment.

FIG. 6 shows transmission data 300 representing transmission information transmitted from transmission unit 23A of terminal 2A to server 5.

Transmission data 300 includes user ID data 302, position data 304, and operation data 306.

User ID data 302 is data for specifying a user who operates a terminal which has transmitted transmission data 300 to server 5.

Position data 304 is data for specifying a position of a terminal.

Operation data 306 is data indicating an accepted operation.

Figure 7:
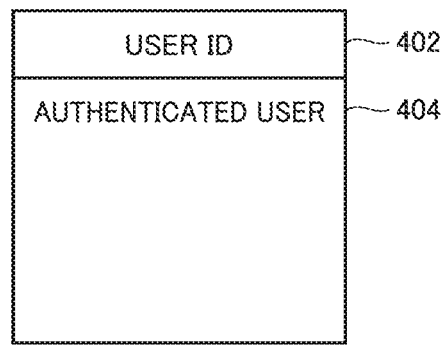
FIG. 7 is a diagram illustrating one example of data on transmission information transmitted from server 5 to terminal 2 based on the embodiment.

FIG. 7 is a diagram illustrating one example of data on transmission information transmitted from server 5 to terminal 2 based on the embodiment.

FIG. 7 shows transmission data 400 representing transmission information transmitted from registration manager 55 of server 5 to terminal 2.

Transmission data 400 includes user ID data 402 and authenticated user data 404.

User ID data 402 is data for specifying a user who operates a terminal to which transmission data 400 is transmitted from server 5.

Authenticated user data 404 is data on another terminal authenticated as satisfying prescribed relation (face-to-face relation by way of example).

In the present example, when authentication as satisfying prescribed relation (face-to-face relation by way of example) is performed, information on a user who operates another terminal authenticated as satisfying prescribed relation is transmitted and whether or not to register the user who operates the authenticated another terminal as a friend is asked. Users who operate respective terminals are registered as satisfying prescribed relation (friend relation by way of example) when they designate each other as being registered as friends in response to the inquiry, and are managed by server 5.

Figure 8:
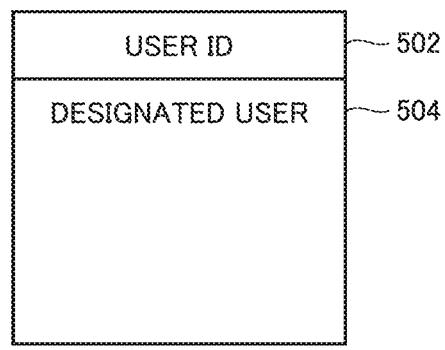
FIG. 8 is a diagram showing transmission data 500 representing transmission information transmitted to server 5 based on the embodiment.

FIG. 8 is a diagram showing transmission data 500 representing transmission information transmitted to server 5 based on the embodiment.

As shown in FIG. 8, transmission data 500 includes user ID data 502 and designated user data 504.

User ID data 502 is data for specifying a user who operates a terminal which has transmitted transmission data 500 to server 5.

Designated user data 504 is data on a designated user who is desired to be registered as a friend in terminal 2.

<Overview of Processing in Information Processing System>

Overview of processing in the information processing system based on the embodiment will now be described.

Figure 9:
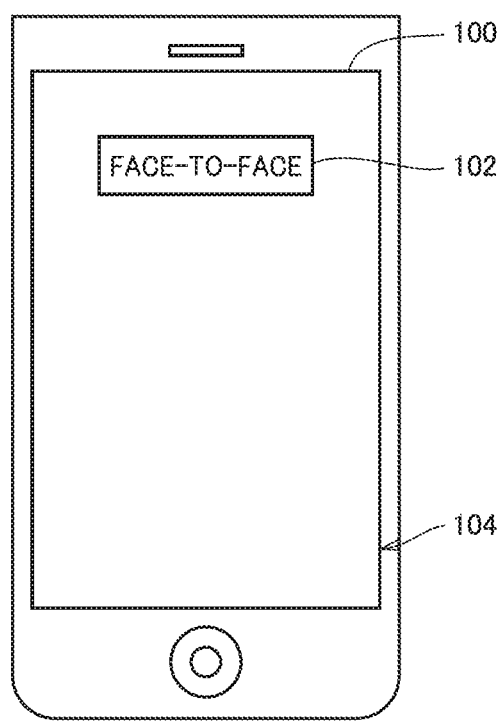
FIG. 9 is a diagram illustrating start of authentication processing based on the embodiment.

FIG. 9 is a diagram illustrating start of authentication processing based on the embodiment.

FIG. 9 shows an initial screen 100 and a face-to-face authentication button 102 is provided by way of example on initial screen 100 of display unit 17. Face-to-face authentication button 102 is a button accepting an instruction to start authentication processing between users who face each other. Authentication start instruction acceptance unit 25A accepts selection of face-to-face authentication button 102 and starts authentication processing.

Face-to-face authentication button 102 may be displayed in response to a prescribed operation input or may steadily be displayed.

By way of example of input unit 16, a touch panel 104 substantially as large as a screen of display unit 17 provided on a surface of terminal 2 is provided. Various inputs (selections) can be made by operating touch panel 104. Touch panel 104 does not necessarily have to be equal in size to the screen, and can be designed to have any size.

Figure 10:
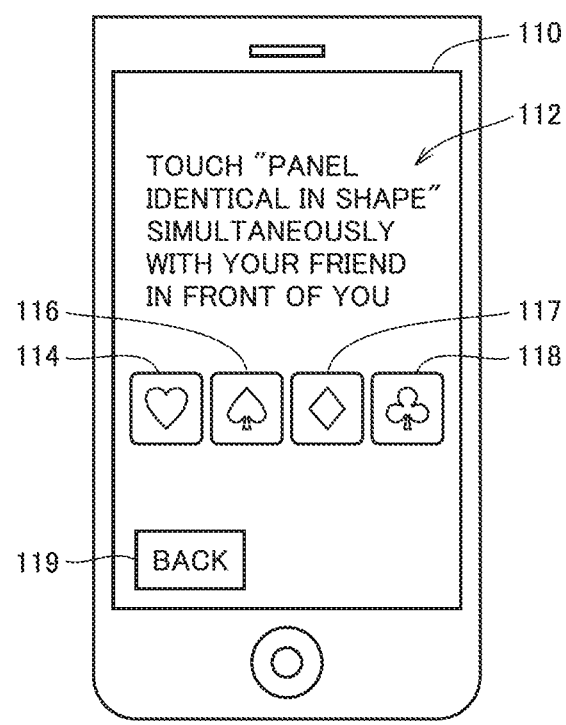
FIG. 10 is a diagram illustrating an operation panel screen 110 based on the embodiment.

FIG. 10 is a diagram illustrating an operation panel screen 110 based on the embodiment.

As shown in FIG. 10, an operation panel which can accept an operation instruction as authentication processing is shown on operation panel screen 110.

Authentication start instruction acceptance unit 25A accepts selection of face-to-face authentication button 102 and instructs display control unit 20A to start authentication. Display control unit 20A has display unit 17 display an operation panel and a message in response to the instruction. Specifically, together with a message 112 "touch 'panel identical in shape' simultaneously with your friend in front of you," operation panels 114 to 118 showing pictures different from one another in shape are displayed. By way of example, operation panels 114 to 118 are shown in the order of heart, spade, diamond, and club.

The user can select any of the plurality of operation panels 114 to 118.

In response to selection, transmission data including operation information and position information is transmitted from terminal 2 to server 5.

A "return" button 119 is provided. When "return" button 119 is selected, authentication ends and transition back to the initial screen in FIG. 9 is made.

Though transmission of transmission data including operation information resulting from selection made once as selection of an operation panel is described in the present example, transmission data including operation information resulting from selection made a plurality of times as selection of operation panels can also be transmitted.

Figure 11:
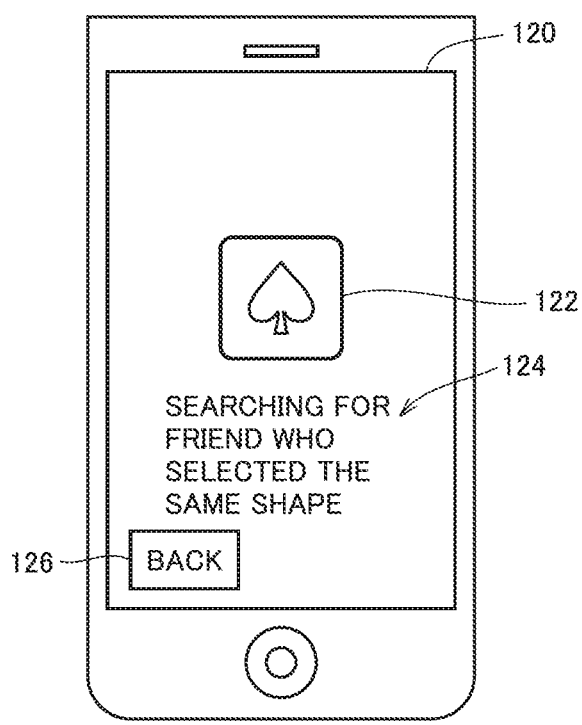
FIG. 11 is a diagram illustrating a stand-by screen during authentication based on the embodiment.

FIG. 11 is a diagram illustrating a stand-by screen during authentication based on the embodiment.

As shown in FIG. 11, a selected operation panel 122 is displayed by way of example on a stand-by screen 120 during authentication. A message 124 "searching for friend who selected the same shape" indicating authentication in progress is displayed.

As selected operation panel 122 is displayed, operation panels selected by the users who face each other and operate respective terminals can readily be compared and checked.

A "return" button 126 is provided. When "return" button 126 is selected, operation panel screen 110 in FIG. 10 is displayed. The user can again select an operation panel.

Therefore, even when the users who face each other and operate respective terminals compare the selected operation panels with each other and determine that a user determines that he/she has performed an erroneous operation, the operation can readily be undone.

Figure 12:
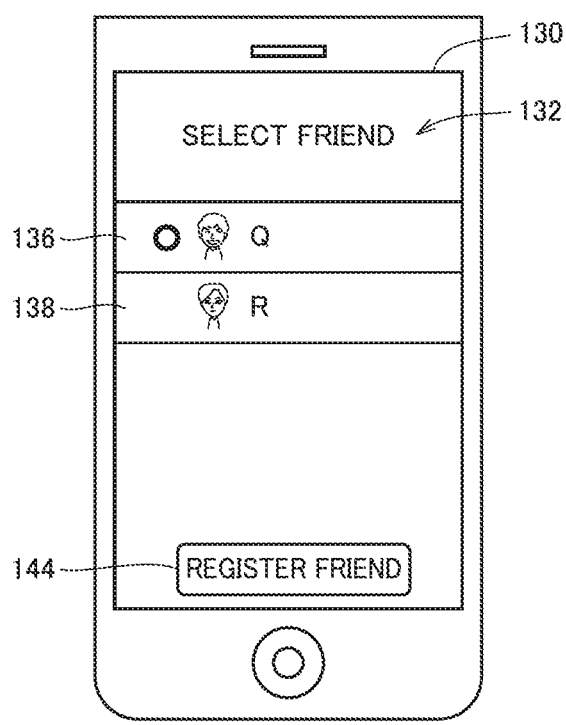
FIG. 12 is a diagram illustrating a user designation screen 130 in user registration processing based on the embodiment.

FIG. 12 is a diagram illustrating a user designation screen 130 in user registration processing based on the embodiment.

FIG. 12 shows as user designation screen 130, a plurality of friends in a list as candidates for friends, in which a user who is to be registered as a friend can be designated from among a plurality of users (Q and R) included in the list. By way of example, items 136 and 138 for selecting Q and R, respectively, are provided. A registration button 144 for registering a friend is provided. The list shows user information on successfully authenticated others, which has been transmitted from server 5.

By inputting a user to be registered as a friend by selecting item 136 or 138, a user to be registered as a friend can be designated.

By way of example, "Q" is designated as a user to be registered as a friend.

By selecting registration button 144, information designating "Q" as a user to be registered as a friend is transmitted to server 5.

Though designation of "Q" as a user to be registered as a friend is described in the present example, a plurality of users (Q and R) can also be designated as users to be registered as friends.

Server 5 determines whether or not users have mutually been designated as friends, by comparing data received from the terminals. For example, when user P of terminal 2A has designated user Q of terminal 2B as a friend, whether or not user Q of terminal 2B has also designated user P of terminal 2A as a friend is determined. When server 5 determines that users have mutually designated authenticated users, it determines that a registration condition has been satisfied and outputs a notification of success to each terminal.

When server 5 determines that comparison of data received from the terminals indicates unmatch, it outputs a notification of failure to each terminal.

Figure 13:
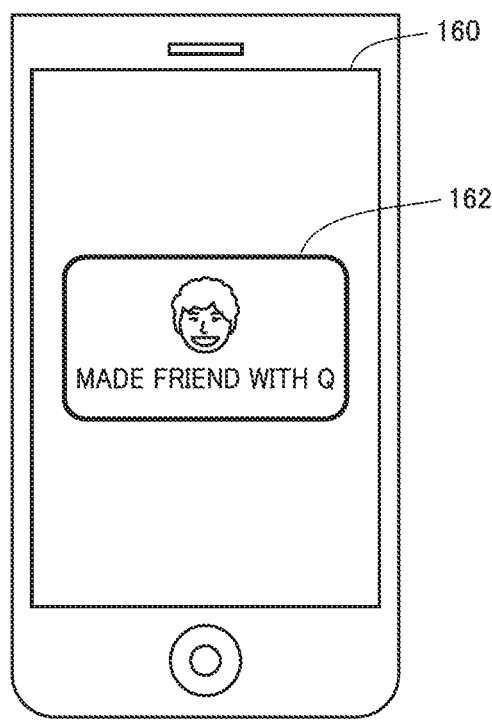
FIG. 13 is a diagram illustrating a success notification screen in the user registration processing based on the embodiment.

FIG. 13 is a diagram illustrating a success notification screen in the user registration processing based on the embodiment.

FIG. 13 shows information on a registered friend on a success notification screen 160. Specifically, a message 162 "made friend with Q" is displayed.

Figure 14:
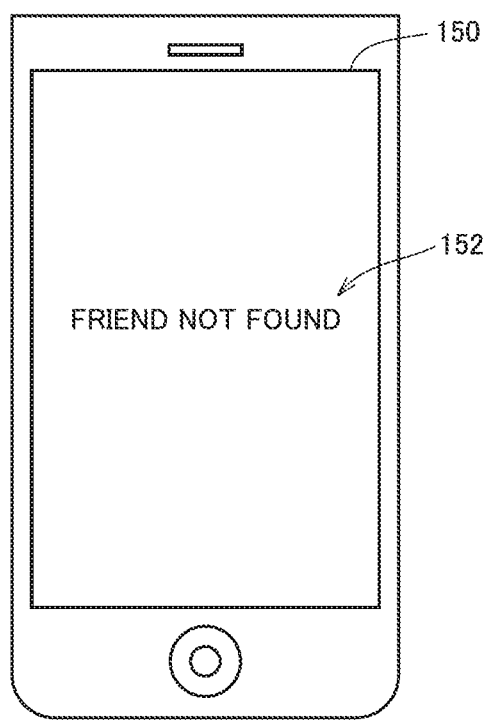
FIG. 14 is a diagram illustrating an authentication failure screen 150 based on the embodiment.

FIG. 14 is a diagram illustrating an authentication failure screen 150 based on the embodiment.

FIG. 14 shows authentication failure screen 150, in which a message indicating failure in authentication is displayed. By way of example, a message 152 "friend not found" is displayed.

Such a screen may be displayed also when a notification of failure is received from server 5.

<Data Communication in Information Processing System>

Figure 15:
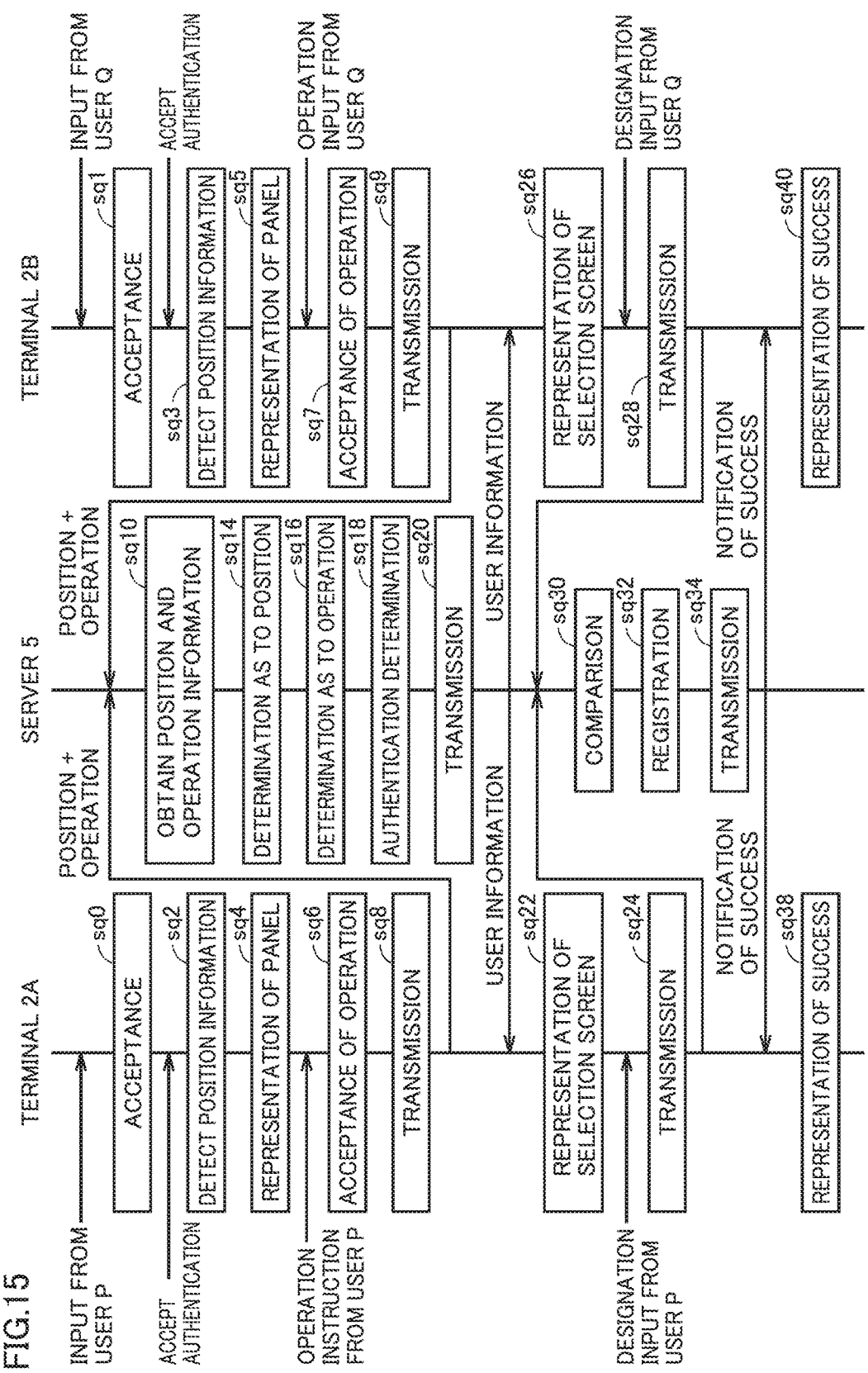
FIG. 15 is a diagram illustrating a flow of processing in data communication in the information processing system based on the embodiment.

FIG. 15 is a diagram illustrating a flow of processing in data communication in the information processing system based on the embodiment.

As shown in FIG. 15, by way of example, a flow of processing in communication of data between terminals 2A and 2B and server 5 will be described.

Terminal 2A accepts input from user P (sequence sq0). Specifically, authentication start instruction acceptance unit 25A accepts an instruction to start authentication in response to selection of face-to-face authentication button 102 on initial screen 100 described with reference to FIG. 9.

Then, terminal 2A detects position information (sequence sq2). Specifically, position information detector 22A detects position information of terminal 2A.

Then, terminal 2A displays a panel (sequence sq4). Specifically, display control unit 20A has operation panel screen 110 described with reference to FIG. 10 displayed.

Then, terminal 2A accepts an operation instruction from user P (sequence sq6). Specifically, operation acceptance unit 21A accepts selection of an operation panel from user P. For example, operation acceptance unit 21A accepts selection of operation panel 116.

Then, terminal 2A transmits data (position and operation) to server 5 (sequence sq8). Specifically, transmission unit 23A transmits transmission data 300 including the detected position information and information on the accepted operation panel (operation information) to server 5 as described with reference to FIG. 6.

Similarly, terminal 2B accepts input from user Q (sequence sq1). Specifically, authentication start instruction acceptance unit 25B accepts an instruction to start authentication in response to selection of face-to-face authentication button 102 on initial screen 100 described with reference to FIG. 9.

Then, terminal 2B detects position information (sequence sq3). Specifically, position information detector 22B detects position information of terminal 2B.

Then, terminal 2B displays a panel (sequence sq5). Specifically, display control unit 20B has operation panel screen 110 described with reference to FIG. 10 displayed.

Then, terminal 2B accepts an operation instruction from user Q (sequence sq7). Specifically, operation acceptance unit 21B accepts selection of an operation panel from user Q. For example, operation acceptance unit 21B accepts selection of operation panel 116.

Then, terminal 2B transmits data (position and operation) to server 5 (sequence sq9). Specifically, transmission unit 23B transmits transmission data 300 including the detected position information and information on the accepted operation panel (operation information) to server 5 as described with reference to FIG. 6.

Server 5 receives data from terminals 2A and 2B and obtains position information and operation information (sequence sq10). Specifically, data obtaining unit 50 receives transmission data 300 from terminals 2A and 2B and obtains position information and operation information thereof.

Server 5 determines positions of terminals 2A and 2B based on the obtained position information (sequence sq14). Specifically, position determination unit 52 determines whether or not terminals 2A and 2B are located within a prescribed distance based on the position information of terminal 2A and the position information of terminal 2B. In the present example, positions of terminal 2A and terminal 2B are determined as being the same.

Then, server 5 determines operations in terminals 2A and 2B based on the obtained operation information (sequence sq16). Specifically, operation determination unit 53 determines whether or not the same operations have been performed based on the operation information of terminal 2A and the operation information of terminal 2B. In the present example, terminal 2A and terminal 2B are determined as having performed the same operation.

Server 5 performs authentication determination as to whether or not prescribed relation is satisfied, based on results of determination as to the positions and the operations (sequence sq18). When those conditions are both satisfied based on results of determination by position determination unit 52 and operation determination unit 53, authentication determination unit 54 authenticates terminals 2A and 2B as satisfying prescribed relation (face-to-face relation). In the present example, as a result of the fact that terminal 2A and terminal 2B are determined as being located at the same position and having performed the same operations (conditions are both satisfied), the terminals are authenticated as satisfying prescribed relation (face-to-face relation).

Server 5 transmits a result of authentication to terminals 2A and 2B (sequence sq20). Specifically, when authentication as satisfying prescribed relation (face-to-face relation) has been performed (successful authentication), authentication determination unit 54 transmits user information on successfully authenticated others. For example, user information of terminal 2B is transmitted to terminal 2A and user information of terminal 2A is transmitted to terminal 2B.

Terminal 2A displays a selection screen based on the information on the authenticated user, which has been transmitted from server 5 (sequence sq22). Specifically, user information obtaining unit 24A obtains user information on successfully authenticated others, which has been transmitted from server 5. Then, user information obtaining unit 24A gives an instruction to display control unit 20A so that display control unit 20A has user designation screen 130 described with reference to FIG. 12 displayed.

Terminal 2A accepts a designation input from user P. Specifically, operation acceptance unit 21A accepts designation of a user to be registered as a friend on user designation screen 130 described with reference to FIG. 12.

Terminal 2A transmits data in accordance with the designation input to server 5 (sequence sq24). Specifically, transmission unit 23A transmits transmission data 400 including data on a designated user.

Terminal 2B displays a selection screen based on the information on the authenticated user, which has been transmitted from server 5 (sequence sq26). Specifically, operation acceptance unit 21B accepts designation of a user to be registered as a friend on user designation screen 130 described with reference to FIG. 12.

Terminal 2B accepts a designation input from user Q. Specifically, operation acceptance unit 21B accepts designation of a user to be registered as a friend on user designation screen 130 described with reference to FIG. 12.

Terminal 2B transmits data in accordance with the designation input to server 5 (sequence sq28). Specifically, transmission unit 23B transmits transmission data 400 including data on a designated user.

Server 5 compares data from terminals 2A to 2B with each other (sequence sq30). Specifically, registration manager 55 determines whether or not a registration condition is satisfied in terminals 2A and 2B, as a result of comparison. When user P of terminal 2A designates user Q of terminal 2B as a friend and user Q of terminal 2B also designates user P of terminal 2A as a friend, it is determined that the registration condition has been satisfied.

Server 5 conducts registration based on the result of comparison (sequence sq32). Specifically, registration manager 55 has friend registration information stored in the user management information described with reference to FIG. 5 when the registration condition is satisfied.

Server 5 transmits a notification of success to terminals 2A and 2B (sequence sq34). Specifically, registration manager 55 outputs the notification of success to terminal 2 when the registration condition is satisfied.

Terminals 2A and 2B provide a representation of success in response to the notification of success from server 5 (sequences sq38 and sq40).

Specifically, registration units 26A and 26B instruct respective display control units 20A and 20B to have a success notification screen displayed as described with reference to FIG. 13, in response to the notification of success. Registration units 26A and 26B have user information on another terminal with which friend relation has been registered stored.

Therefore, under the scheme according to the embodiment, whether or not prescribed relation (face-to-face relation) is satisfied is checked based on position information and operation information from terminals 2A and 2B. When it is determined that prescribed relation is satisfied (authentication has been successful), user information on successfully authenticated others is transmitted to terminals 2A and 2B and setting as to whether or not to register them as a friend is accepted. When terminals 2A and 2B mutually give designation as registration of them as friends, it is determined that a registration condition (friend relation) has been satisfied and the users are registered as friends.

Namely, the scheme according to the embodiment includes determination processing in two stages, in which whether or not face-to-face relation is satisfied is checked and thereafter whether or not friend relation is satisfied is determined. Through such processing, whether or not users who operate terminals communicating data with each other satisfy prescribed relation can be authenticated under a safe scheme.

As relation between users registered as friends is defined as user management information in server 5, a prescribed service between the users satisfying friend relation can readily be made use of by making use of the user management information stored in server 5, for example, even when the users operate terminals other than terminal 2 (a PDA, a PC, or other information instruments).

Though a case that authentication as to whether or not users who operate terminals communicating data with each other satisfy prescribed relation is performed has been described above, authentication as to whether or not terminals satisfy prescribed relation may be performed. In this case, since terminals are registered as satisfying friend relation, the terminals which are in friend relation can make use of a prescribed service in a more secure state.

Though determination processing in two stages is described above, authentication as users satisfying prescribed relation (friend relation) can also be performed when authentication as satisfying face-to-face relation has been performed. Specifically, when authentication determination unit 54 has performed authentication as satisfying prescribed relation (face-to-face relation) (authentication has been successful), registration manager 55 determines that a registration condition (friend relation) has been satisfied without accepting designation of a user to be registered and may register the users as friends. Namely, when authentication as satisfying face-to-face relation has been performed, registration manager 55 may automatically have information on friend registration stored in user management information in memory 23.

Though friend registration of users P and Q who operate terminals 2A and 2B, respectively, has been described above, the users are not limited in particular to two and more users are also similarly applicable. For example, user R who operates another terminal may be registered as a friend together with users P and Q, through similar processing. By way of example, as described with reference to FIG. 12, a plurality of (three or more) users can be registered as friends by designating a plurality of users (Q and R) as users to be registered as friends.

<Processing Flow in Terminal 2>

Figure 16:
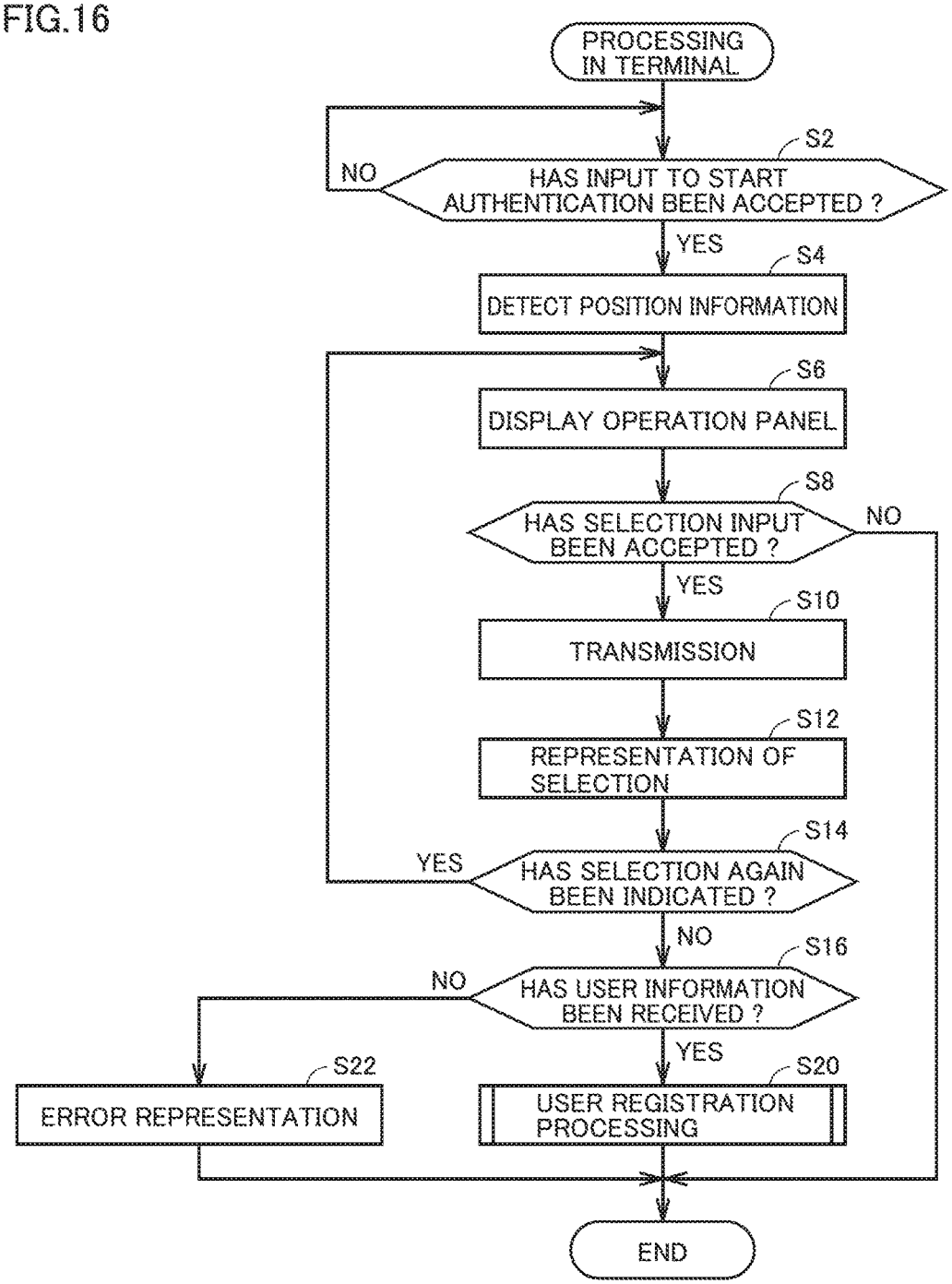
FIG. 16 is a flowchart illustrating application processing performed in terminal 2 based on the embodiment.

FIG. 16 is a flowchart illustrating application processing performed in terminal 2 based on the embodiment. Each terminal 2 has an application program for performing application processing stored in program storage 15. Though terminal 2A is described by way of example in the present example, limitation to terminal 2A is not particularly intended and other terminals are also similar.

As shown in FIG. 16, terminal 2 determines whether or not an input for starting authentication has been accepted (step S2). Specifically, authentication start instruction acceptance unit 25A determines whether or not an instruction to start authentication has been accepted from a user as described with reference to FIG. 9.

Then, terminal 2 maintains the state in step S2 until an input for start of authentication is accepted. When terminal 2 determines that the input has been accepted (YES in step S2), the process proceeds to step S4.

Then, terminal 2 detects position information (step S4). Specifically, position information detector 22A detects position information of terminal 2A with GPS 12.

Then, terminal 2 displays an operation panel (step S6). Specifically, display control unit 20A has display unit 17 display an operation panel for authentication as described with reference to FIG. 10.

Then, terminal 2 determines whether or not an input to select an operation panel has been accepted (step S8). Specifically, operation acceptance unit 21A accepts selection of an operation panel from a user.

When terminal 2 determines in step S8 that an input for selecting an operation panel has been accepted (YES in step S8), terminal 2 transmits transmission data to server 5. Specifically, transmission unit 23A transmits transmission data 300 described with reference to FIG. 6 to server 5.

Then, terminal 2 displays the selected operation panel (step S12). Specifically, display control unit 20A has display unit 17 display stand-by screen 120 during authentication described with reference to FIG. 11.

Then, terminal 2 determines whether or not an instruction for selection again has been given (step S14). Specifically, operation acceptance unit 21A determines whether or not an input to select "return" button 126 on stand-by screen 120 has been accepted.

When terminal 2 determines that an instruction for selection again has been given (YES in step S14), the process returns to step S6. Then, an operation panel is displayed again (step S6). Specifically, display control unit 20A has an operation panel for authentication displayed.

When terminal 2 determines that no instruction for selection again has been given (NO in step S14), it determines whether or not information on a successfully authenticated user has been received (step S16). Specifically, user information obtaining unit 24A determines whether or not user information on other successfully authenticated users has been obtained as a result of authentication by server 5.

When terminal 2 determines in step S16 that the information on the successfully authenticated users has been received, terminal 2 performs user registration processing (step S20). The user registration processing will be described later. Then, the process ends (end).

When terminal 2 determines in step S16 that information on the successfully authenticated users has not been received (NO in step S16), an error representation is provided (step S22). Then, the process ends (end).

When terminal 2 determines in step S8 that an input for selecting an operation panel has not been accepted (NO in step S8), the process ends (end). Specifically, when operation acceptance unit 21A accepts selection of "return" button 119 on operation panel screen 110 in FIG. 10, the process ends and transition back to the initial screen in FIG. 9 is made.

Figure 17:
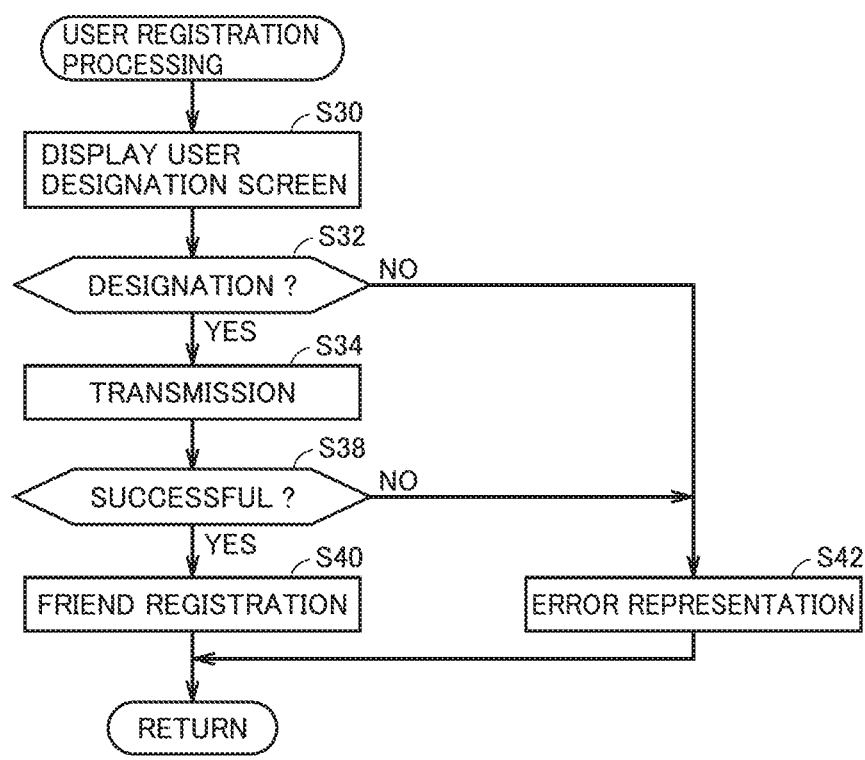
FIG. 17 is a flowchart illustrating user registration processing in terminal 2 based on the embodiment.

FIG. 17 is a flowchart illustrating user registration processing in terminal 2 based on the embodiment.

As shown in FIG. 17, terminal 2 displays a user designation screen (step S30). Specifically, user information obtaining unit 24A obtains user information and gives an instruction to display control unit 20A so that display control unit 20A has user designation screen 130 described with reference to FIG. 12 displayed.

Then, terminal 2 determines whether or not user designation has been made (step S32). Specifically, operation acceptance unit 21A determines whether or not designation of a user to be registered has been accepted on user designation screen 130 from a user.

When terminal 2 determines in step S32 that designation has been made (YES in step S32), it transmits information on the designated user (step S34). Specifically, transmission unit 23A transmits transmission data 500 including data on the designated user to server 5.

Then, terminal 2 determines whether or not a notification of success has been received (step S38). Specifically, registration unit 26A determines whether or not a notification of success has been received from server 5.

Then, when terminal 2 determines that the notification of success has been received, it conducts friend registration (step S40). Specifically, when it is determined that the notification of success has been received from server 5, registration unit 26A has a success notification screen displayed as described with reference to FIG. 13 and has user information stored.

Then, the process ends (return).

When terminal 2 determines that a notification of success has not been received (NO in step S38), an error representation is provided (step S42). Specifically, when it is determined that registration unit 26A has received a notification of failure from server 5, it instructs display control unit 20A to have an authentication failure screen described with reference to FIG. 14 displayed.

Then, the process ends (return).

When terminal 2 determines in step S32 that designation of a user has not been made (NO in step S32), an error representation is provided (step S42). When operation acceptance unit 21A does not accept designation of a user, it instructs display control unit 20A to have an authentication failure screen described with reference to FIG. 14 displayed.

Then, the process ends (return).

<Processing Flow in Server 5>

Figure 18:
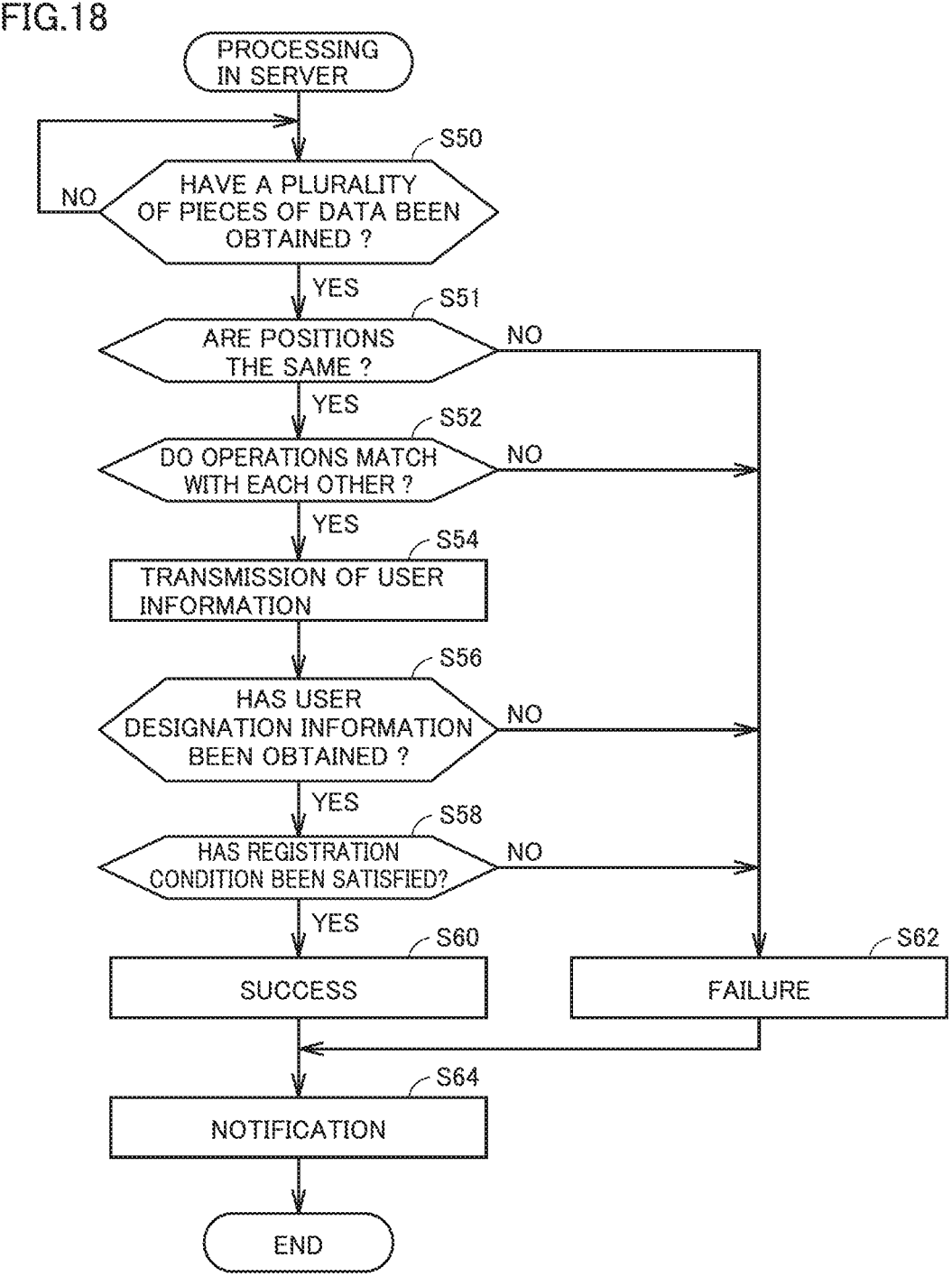
FIG. 18 is a flowchart illustrating processing performed in server 5 based on the embodiment.

FIG. 18 is a flowchart illustrating processing performed in server 5 based on the embodiment. Server 5 has program storage 24 store an application program for performing the processing.

As shown in FIG. 18, server 5 determines whether or not a plurality of pieces of transmission data have been obtained (step S50). Specifically, data obtaining unit 50 determines whether or not transmission data 300 including position information and operation information has been obtained from terminals 2A and 2B.

When only transmission data 300 from one of them is obtained, subsequent processing is not performed. For example, whether or not a plurality of pieces of transmission data have been obtained may be determined based on whether or not the time of obtainment of transmission data from terminal 2A and the time of obtainment of transmission data from terminal 2B are within a prescribed period.

Then, when it is determined in step S50 that a plurality of pieces of transmission data have been obtained (YES in step S50), server 5 determines whether or not positions are the same (step S51). Specifically, when data obtaining unit 50 determines that the plurality of pieces of transmission data have been obtained, it instructs position determination unit 52 to determine whether or not positions are the same with regard to the plurality of pieces of obtained transmission data, based on position information.

Then, when server 5 determines in step S51 that the positions are the same, it determines whether or not operations match with each other (step S52). Specifically, when it is determined that the positions are the same based on a result of determination by position determination unit 52, operation determination unit 53 is instructed to determine whether or not the operations match with each other with regard to the plurality of pieces of obtained transmission data, based on operation information.

When server 5 determines in step S52 that the operations match with each other (YES in step S52), information on other successfully authenticated users is transmitted (step S54). Specifically, when authentication determination unit 54 determines that the positions are the same and the operations match with each other based on the results of determination by position determination unit 52 and operation determination unit 53, it determines that the users satisfy prescribed relation and transmits information on other users who have been authenticated as satisfying prescribed relation (successfully authenticated) to terminals 2A and 2B. Though a scheme in which whether or not positions are the same is determined in step S51 and thereafter whether or not operations match with each other is determined in step S52 has been described in the present example, the order of determination processing is also interchangeable.

Then, server 5 determines in step S56 whether or not user designation information has been obtained (step S56). Specifically, registration manager 55 determines whether or not user designation information designating a user to be registered has been obtained from terminals 2A and 2B.

Then, server 5 determines whether or not a registration condition has been satisfied (step S58). Specifically, registration manager 55 determines whether or not a registration condition is satisfied based on the obtained user designation information. When user P of terminal 2A designates user Q of terminal 2B as a friend as the obtained user designation information, registration manager 55 determines whether or not user Q of terminal 2B also designates user P of terminal 2A as a friend.

Then, when server 5 determines in step S58 that the registration condition has been satisfied (YES in step S58), it makes a determination as success (step S60). When user P of terminal 2A designates user Q of terminal 2B as a friend and user Q of terminal 2B also designates user P of terminal 2A as a friend as the obtained user designation information, registration manager 55 determines that the registration condition has been satisfied (success). When the registration condition has been satisfied, registration manager 55 has the friend registration information stored in the user management information in memory 23.

Then, server 5 gives a notification of success (step S64). Registration manager 55 transmits the notification of success to terminals 2A and 2B.

Then, server 5 quits the process (end).

When server 5 determines in step S51 that the positions are not the same (NO in step S51) or determines in step S52 that the operations do not match with each other, server 5 makes a determination as failure (step S62). Authentication determination unit 54 makes a determination as failure in authentication based on the result of determination as to positions and the result of determination as to operations.

Then, server 5 gives a notification of failure in step S64. Then, server 5 quits the process (end).

Specifically, authentication determination unit 54 notifies terminals 2A and 2B of failure in authentication.

When server 5 determines in step S56 that user designation information has not been obtained (NO in step S56) or determines in step S58 that the registration condition is not satisfied (step S58), server 5 makes a determination as failure in registration (step S62). Specifically, registration manager 55 makes a determination as the registration condition not being satisfied and failure in registration.

Then, server 5 gives a notification of failure in step S64. Then, server 5 quits the process (end). Specifically, registration manager 55 notifies terminals 2A and 2B of failure.

(First Modification)

A scheme in which GPS 12 is provided in terminal 2, GPS 12 of terminal 2 detects a position, and detected information is transmitted to server 5 has been described in the embodiment above.

A configuration can be such that GPS 12 is not provided in each terminal 2.

Figure 19:
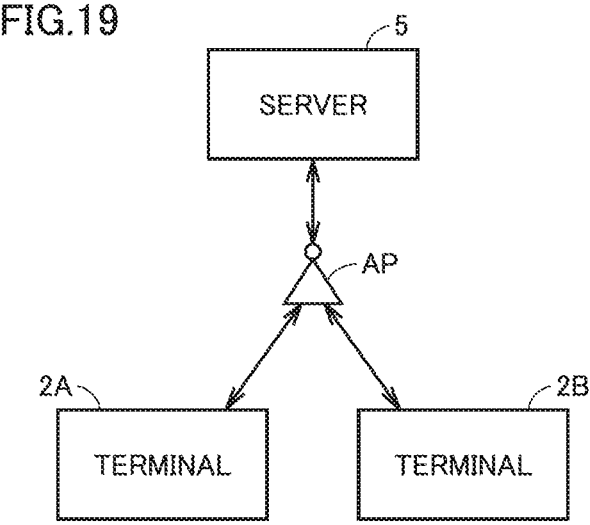
FIG. 19 is a diagram showing a configuration of one example of the information processing system based on a first modification of the embodiment.

FIG. 19 is a diagram showing a configuration of one example of the information processing system based on a first modification of the embodiment.

As shown in FIG. 19, the information processing system according to the first modification further has an access point AP and data is communicated between terminal 2 and server 5 through access point AP.

Then, when position information is associated with access point AP, position information of access point AP can also be made use of as position information of a terminal.

Specifically, information on access point AP which is passed through is also added to transmission data transmitted from terminal 2 to server 5.

When server 5 obtains transmission data in data obtaining unit 50, it may obtain position information from the information on access point AP included in the transmission data and determine whether or not positions are the same in position determination unit 52.

In this case, each terminal 2 can include no position information detector 22A as a configuration without GPS 12.

Though a case that position information is obtained from access point AP has been described, it may be determined that positions are the same when it is determined that transmission data has been received from the same access point AP even though position information is not associated with access point AP.

(Second Modification)

Figure 20:
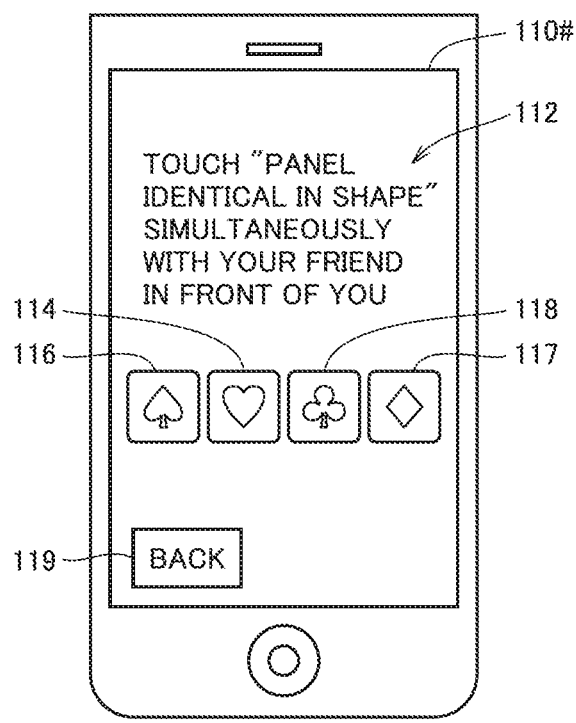
FIG. 20 is a diagram illustrating an operation panel screen 110# based on a second modification of the embodiment.

FIG. 20 is a diagram illustrating an operation panel screen 110# based on a second modification of the embodiment.

As shown in FIG. 20, an operation panel which can accept an operation instruction as authentication processing is shown on operation panel screen 110#.

Operation panel screen 110# is different from operation panel screen 110 in position of representation of a plurality of operation panels 114 to 118.

By way of example, operation panels 114 to 118 are shown in the order of spade, heart, club, and diamond.

Transmission data including operation information and position information is transmitted from terminal 2 to server 5 in response to selection.

In the present second modification, display control unit 20A selects and arranges positions of operation panels under a prescribed rule such that positional relation among the operation panels is changed each time in displaying the operation panels on display unit 17. For example, display control unit 20A randomly selects and arranges positions of operation panels. Display control unit 20A may change the position of representation on display unit 17 without changing positional relation among the operation panels.

Since positions of the operation panels are changed through the processing, security can be enhanced with a simplified scheme and the possibility that an unknown third party is authenticated as satisfying face-to-face relation can be lowered.

(Third Modification)

Though a scheme in which authentication as to whether or not prescribed relation is satisfied is performed based on position information and operation information included in transmission data transmitted from terminals 2A and 2B has been described above, security can also be enhanced by further including time information.

Specifically, time information may be included, in addition to position information and operation information in transmission data transmitted from terminals 2A and 2B.

Figure 21:
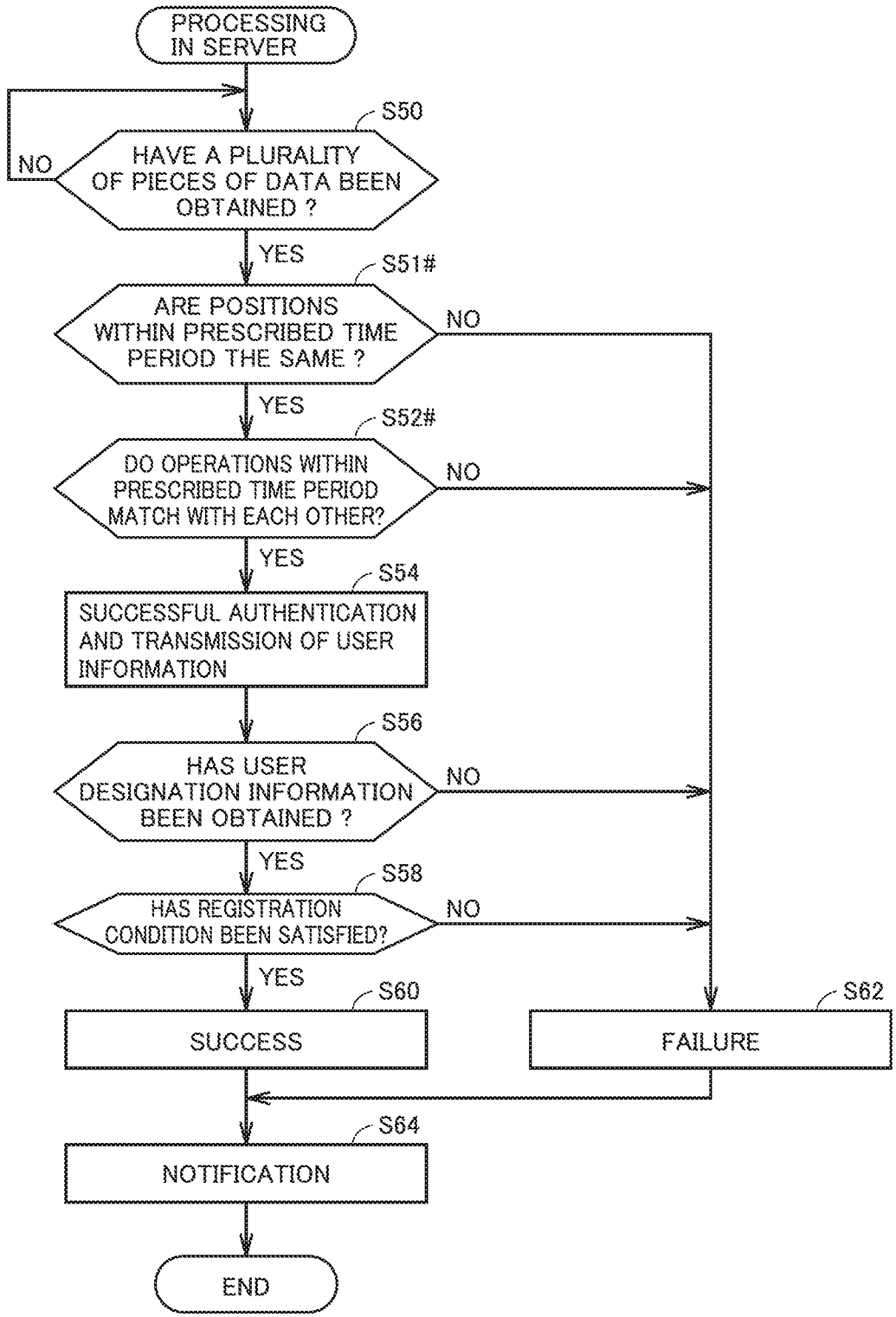
FIG. 21 is a flowchart illustrating processing performed in server 5 based on a third modification of the embodiment.

FIG. 21 is a flowchart illustrating processing performed in server 5 based on a third modification of the embodiment.

As shown in FIG. 21, processing in server 5 is different in replacement of steps S51 and S52 with steps S51# and S52#.

Specifically, in step S51#, whether or not positions within a prescribed period of time are the same is determined (step S51#). Specifically, when data obtaining unit 50 determines that a plurality of pieces of transmission data have been obtained, it instructs position determination unit 52 to determine whether or not positions are the same with regard to the obtained plurality of pieces of transmission data, based on position information. In addition, whether or not the time of detection of the position information is within a prescribed period of time is determined.

When it is determined in step S51# that the positions within the prescribed period of time are the same, whether or not operations match with each other is determined (step S52#). Specifically, when it is determined that positions within the prescribed period of time are the same based on a result of determination by position determination unit 52, operation determination unit 53 is instructed to determine whether or not operations match with each other with regard to the obtained plurality of pieces of transmission data, based on operation information. In addition, whether or not the time of detection of the operation information is within the prescribed period of time is determined.

When server 5 determines in step S52# that the operations within the prescribed period of time match with each other (YES in step S52#), it transmits information on other successfully authenticated users (step S54).

Since subsequent processing is the same, detailed description thereof will not be repeated.

Since a position or an operation within a prescribed period of time is required as a condition in the processing above, security can further be enhanced. Whether or not any one of processing in step S51# and processing in step S52# is within a prescribed period of time may be determined.

(Fourth Modification)

Though a scheme in which selection from a plurality of operation panels different in shape is made on operation panel screen 110 has been described above, limitation thereto is not intended and selection from a plurality of operation panels identical in shape but different in color can also be made. Selection from a plurality of operation panels different in shape and color can also be made. For example, by differently coloring heart, spade, diamond, and club described with reference to FIG. 10, authentication processing can readily be performed even though recognizability of any of a color and a shape is low.

Though a scheme in which whether or not operations onto operation panels displayed on operation panel screen 110 match with each other is used for authentication determination has been described above, for example, input voice and sound may be made use of, instead of an operation. Specifically, audio data of input voice and sound is included in transmission data and the transmission data is transmitted to server 5. Whether or not information obtained based on voice recognition in server 5 is the same between/among terminals may be determined.

Though an input (selection and pressing) of an operation panel is made by operating touch panel 104 in the present example, an input onto an operation panel may be made, for example, by a different input. For example, a gesture input may be made on an operation panel. For example, in selecting heart, a gesture input as drawing a shape of heart through a series of inputs with a finger may be accepted. This is also applicable to other cases.

Though an input is made by using touch panel 104 provided on operation panel screen 110 in the above example, an input (selection) onto a physical button provided in terminal 2 may naturally be made.

Alternatively, an image may be made use of. Specifically, when terminal 2 has a camera, the camera is used to pick up an image, and data on the picked-up image is included in transmission data for transmission to server 5. Server 5 may determine whether or not data of picked-up image is the same.

Alternatively, azimuth information may be made use of. Specifically, when terminal 2 has an azimuth sensor, data obtained by the azimuth sensor is included in transmission data for transmission to server 5. Server 5 may determine whether or not data obtained from the azimuth sensor is the same.

Alternatively, fingerprint information may be made use of. Specifically, when terminal 2 has a fingerprint sensor, for example, user P of terminal 2A makes use of a fingerprint sensor and transmits his/her own fingerprint data to server 5, and user Q makes use of a fingerprint sensor of terminal 2B and transmits fingerprint data of user Q to server 5 as transmission data of terminal 2B. Server 5 may determine whether or not obtained fingerprint data are the same.

Alternatively, an ultrasonic signal may be made use of. Specifically, when terminal 2 has a function to transmit and receive an ultrasonic signal, an ultrasonic signal including prescribed data is transmitted from terminal 2A to terminal 2B and terminal 2B receives the ultrasonic signal.

Transmission data including the prescribed data is transmitted from terminal 2A to server 5 and the prescribed data included in the received ultrasonic signal is transmitted from terminal 2B to server 5 as being included in transmission data. Server 5 may determine whether or not the obtained prescribed data are the same.

Though a case that display control unit 20A has display unit 17 display an operation panel in response to an instruction from authentication start instruction acceptance unit 25A has been described in the embodiment above, an operation panel may be displayed on display unit 17 in response to an instruction from server 5. Display control unit 20A of terminal 2 may have an operation panel displayed based on information stored in memory 14 or program storage 15, as an operation panel to be displayed on display unit 17, or an operation panel may be displayed based on information transmitted from server 5.

An application executable by a personal computer may be provided as a program in the present embodiment. Here, the program according to the present embodiment may be incorporated as a partial function (a module) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or an preceding an element does not exclude the presence of a plurality of such elements.

What is claimed is:

1. A server configured to communicate with a plurality of electronic terminal devices, the server comprising:
   an interface configured to facilitate communication with the electronic terminal devices;
   processing resources including at least one hardware processor and a memory, the processing resources being configured to control the server to at least:
   obtain physical position information of each terminal device and operation information corresponding to a physical input operation taken with respect to a surface of each terminal device;

obtain time information together with the physical position information and/or operation information of each terminal device that are to be obtained;

determine whether the obtained physical position information of one terminal device and the obtained physical position information of at least one other terminal device satisfy a first prescribed condition;

determine whether the obtained operation information of the one terminal device and the obtained operation information of the at least one other terminal device satisfy a second prescribed condition;

receive an authentication determination, the authentication determination providing enhanced security by being performed to depend on the first prescribed condition and the second prescribed condition being satisfied, and the obtained time information; and register information relating to a user of the one terminal device and information relating to a user of the at least one other terminal device in correspondence with each other, conditioned on the authentication determination.

2. The server according to claim 1, wherein the first prescribed condition tests whether a distance from a position indicated by the physical position information of the one terminal device to a position indicated by the physical position information of the at least one other terminal device is within a prescribed distance.

3. The server according to claim 1, wherein the processing resources are further configured to control the server to at least transmit information indicating the user of the at least one other terminal device to the one terminal device and transmit information indicating the user of the one terminal device to the at least one other terminal device when both of the first prescribed condition and the second prescribed condition are satisfied.

4. The server according to claim 3, wherein the information relating to the user of the one terminal device and the information relating to the user of the at least one other terminal device is registered in correspondence with each other in response to the server receiving a registration instruction from the one terminal device and the at least one other terminal device and after transmission of the information indicating the user of the at least one other terminal device and the information indicating the user of the one terminal device.

5. The server according to claim 4, wherein information relating to a user of one terminal device and information relating to users of at least two other terminal devices is registered in correspondence with each other in response to the server receiving a registration instruction for registering information relating to a plurality of users of terminal devices other than the user's own terminal device from at least three terminal devices.

6. A method of controlling a server configured to communicate with a plurality of electronic terminal devices, the method comprising:

obtaining physical position information of each terminal device and operation information corresponding to a physical input operation taken with respect to a surface of each terminal device, wherein time information is obtained together with the physical position information and/or operation information;

determining whether the obtained physical position information of one terminal device and the obtained physical position information of at least one other terminal device satisfy a first prescribed condition;

determining whether the obtained operation information of the one terminal device and the obtained operation information of the at least one other terminal device satisfy a second prescribed condition;

receiving an authentication determination, the authentication determination providing enhanced security by being performed to depend on the first prescribed condition and the second prescribed condition being satisfied, and the obtained time information; and registering information relating to a user of the one terminal device and information relating to a user of the at least one other terminal device in correspondence with each other, conditioned on the authentication determination.

7. The method according to claim 6, further comprising transmitting information indicating the user of the at least one other terminal device to the one terminal device and transmitting information indicating the user of the one terminal device to the at least one other terminal device, when both of the first prescribed condition and the second prescribed condition are satisfied.

8. The method according to claim 7, further comprising registering the information relating to the user of the one terminal device and the information relating to the user of the at least one other terminal device in correspondence with each other in response to the server receiving a registration instruction from the one terminal device and the at least one other terminal device and after transmission of the information indicating the user of the at least one other terminal device and the information indicating the user of the one terminal device.

9. The method according to claim 6, wherein each terminal device includes a touch panel configured to accept user input, and wherein operation information corresponds to user input provided via the touch panel.

10. A non-transitory storage medium encoded with a computer readable control program executable by a computer of a server operable to communicate with a plurality of electronic terminal devices to perform functionality comprising:

obtaining physical position information of each terminal device and operation information corresponding to a physical input operation taken with respect to a surface of each terminal device, wherein time information is obtained together with the physical position information and/or operation information;

determining whether the obtained physical position information of one terminal device and the obtained physical position information of at least one other terminal device satisfy a first prescribed condition;

determining whether the obtained operation information of the one terminal device and the obtained operation information of the at least one other terminal device satisfy a second prescribed condition;

receiving an authentication determination, the authentication determination providing enhanced security by being performed to depend on the first prescribed condition and the second prescribed condition being satisfied, and the obtained time information; and registering information relating to a user of the one terminal device and information relating to a user of the at least one other terminal device in correspondence with each other, conditioned on the authentication determination.

11. The non-transitory storage medium of claim 10, wherein the control program is operable to provide functionality further comprising transmitting information indicating the user of the at least one other terminal device to the one terminal device and transmitting information indicating the user of the one terminal device to the at least one other terminal device, when both of the first prescribed condition and the second prescribed condition are satisfied.

12. The non-transitory storage medium of claim 11, wherein the control program is operable to provide functionality further comprising registering the information relating to the user of the one terminal device and the information relating to the user of the at least one other terminal device in correspondence with each other in response to the server receiving a registration instruction from the one terminal device and the at least one other terminal device and after transmission of the information indicating the user of the at least one other terminal device and the information indicating the user of the one terminal device.

13. The non-transitory storage medium of claim 10, wherein each terminal device has a display configured to display a plurality of objects that can be selectively interacted with through a touch panel provided to the respective terminal device.

14. The non-transitory storage medium of claim 13, wherein the second prescribed condition tests whether an input of an identical object among the plurality of objects has been accepted, using the operation information obtained from at least two terminals.

15. An information processing system, comprising:
a plurality of electronic terminal devices; and
a server configured to communication with the plurality of terminal devices;
the server including processing resources including at least one hardware processor and a memory, the processing resources being configured to control the server to at least:
  obtain physical position information of each terminal and operation information corresponding to a physical input operation taken with respect to a surface of each terminal device,
  determine whether the obtained physical position information of one terminal device and the obtained physical position information of at least one other terminal device satisfy a first prescribed condition,
  determine whether the obtained operation information of the one terminal device and the obtained operation information of the at least one other terminal device satisfy a second prescribed condition,
  receive an authentication determination, the authentication determination providing enhanced security by being performed to depend on the first prescribed condition and the second prescribed condition being satisfied, and the obtained time information, and
  register information relating to a user of the one terminal device and information relating to a user of the at least one other terminal in correspondence with each other, conditioned on the authentication determination.

16. The information processing system according to claim 15, wherein:
each terminal device includes a touch panel configured to accept user input, and
operation information corresponds to user input provided via the touch panel.

17. The information processing system according to claim 16, wherein each terminal device has a display configured to display a plurality of objects that can be selectively interacted with through the touch panel.

18. The information processing system according to claim 17, wherein an arrangement of the plurality of objects displayed on each terminal device is changeable.

19. The information processing system according to claim 17, wherein the plurality of objects are different in color and/or form.

20. The information processing system according to claim 17, wherein the second prescribed condition tests whether an input of an identical object among the plurality of objects has been accepted, using the operation information obtained from at least two terminals.

* * * * *